United States Patent
Ichikawa

(10) Patent No.: US 10,420,196 B2
(45) Date of Patent: *Sep. 17, 2019

(54) LIGHTING CIRCUIT AND VEHICLE LAMP HAVING THE SAME

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/887,802

(22) Filed: Feb. 2, 2018

(65) Prior Publication Data

US 2018/0160515 A1 Jun. 7, 2018

Related U.S. Application Data

(63) Continuation of application No. 14/855,439, filed on Sep. 16, 2015, now Pat. No. 9,907,151.

(30) Foreign Application Priority Data

Sep. 16, 2014 (JP) .................... 2014-187991
Dec. 25, 2014 (JP) .................... 2014-263103
Jul. 27, 2015 (JP) .................... 2015-147799

(51) Int. Cl.
*H05B 37/02* (2006.01)
*H05B 37/03* (2006.01)
(Continued)

(52) U.S. Cl.
CPC .......... *H05B 37/03* (2013.01); *B60Q 1/0088* (2013.01); *B60Q 1/1415* (2013.01);
(Continued)

(58) Field of Classification Search
CPC .. B60Q 11/005; B60Q 11/0088; B60Q 1/005; H05B 33/0884; H05B 33/089; H05B 37/03
See application file for complete search history.

(56) References Cited

U.S. PATENT DOCUMENTS 4,507,767 A * 3/1985 Takasugi ................ G11B 7/126
250/205
5,714,863 A * 2/1998 Hwang ................ H02M 3/158
320/166
(Continued)

FOREIGN PATENT DOCUMENTS

CN 102232264 A 11/2011
CN 103165085 A 6/2013
(Continued)

OTHER PUBLICATIONS

Office Action in corresponding German Application No. 102015217712.2, dated May 4, 2016 (10 pages).
(Continued)

*Primary Examiner* — Alexander H Taningco
*Assistant Examiner* — Kurtis R Bahr
(74) *Attorney, Agent, or Firm* — Osha Liang LLP

(57) ABSTRACT

A lighting circuit for a light source includes a drive circuit that supplies a lamp current to the light source, detects the lamp current, and executes feedback control such that the lamp current approaches a target current, and an overcurrent protection circuit that is inserted between the drive circuit and the light source and that restricts the lamp current flowing into the light source so that the lamp current does not exceed an overcurrent threshold value. The overcurrent protection circuit includes a transistor, an inductor, a rectifier, a current sensor that generates a current detection signal according to the lamp current, and an overcurrent protection controller that controls ON/OFF of the transistor based on
(Continued)

the current detection signal and the overcurrent threshold value. The transistor, the inductor and the rectifier are disposed in a T-shape.

12 Claims, 18 Drawing Sheets

(51) Int. Cl.
*B60Q 1/14* (2006.01)
*B60Q 1/00* (2006.01)
*B60Q 11/00* (2006.01)
*H05B 33/08* (2006.01)

(52) U.S. Cl.
CPC ......... *B60Q 11/005* (2013.01); *H05B 33/089* (2013.01); *H05B 33/0815* (2013.01); *Y02B 20/341* (2013.01)

(56) References Cited

U.S. PATENT DOCUMENTS

| | | | | |
|---|---|---|---|---|
| 5,828,177 | A * | 10/1998 | Toda | H05B 41/2921 315/127 |
| 6,417,624 | B1 * | 7/2002 | Ito | B60Q 1/1415 307/10.8 |
| 7,276,861 | B1 * | 10/2007 | Shteynberg | H02M 3/157 315/291 |
| 7,602,485 | B2 * | 10/2009 | Mori | G01S 7/481 356/239.2 |
| 8,179,110 | B2 * | 5/2012 | Melanson | H02M 3/156 323/282 |
| 8,400,078 | B2 * | 3/2013 | Shiu | H05B 33/089 315/302 |
| 8,754,592 | B2 * | 6/2014 | Aoki | H05B 33/0845 315/119 |
| 8,830,702 | B2 * | 9/2014 | Macfarlane | H02M 1/4225 363/16 |
| 9,189,966 | B2 | 11/2015 | Li et al. | |
| 9,189,996 | B2 * | 11/2015 | Casper | G09G 3/3413 |
| 2004/0070374 | A1 | 4/2004 | Ito et al. | |
| 2007/0103098 | A1 | 5/2007 | Shiotsu et al. | |
| 2008/0203946 | A1 | 8/2008 | Ito et al. | |
| 2010/0007290 | A1 * | 1/2010 | Urakabe | H05B 33/0827 315/295 |
| 2010/0052537 | A1 | 3/2010 | Murakami et al. | |
| 2010/0079124 | A1 | 4/2010 | Melanson | |
| 2010/0188784 | A1 * | 7/2010 | Young | H02M 3/155 361/18 |
| 2012/0062148 | A1 * | 3/2012 | Kim | H05B 33/0815 315/297 |
| 2012/0326632 | A1 * | 12/2012 | Kitagawa | H05B 33/0815 315/307 |
| 2013/0176031 | A1 * | 7/2013 | Huang | B60Q 11/005 324/414 |
| 2014/0210353 | A1 | 7/2014 | Chen | |
| 2014/0292200 | A1 | 10/2014 | Hu et al. | |
| 2015/0156846 | A1 * | 6/2015 | Cao | H05B 33/0887 315/122 |
| 2015/0208476 | A1 | 7/2015 | Muramatsu et al. | |

FOREIGN PATENT DOCUMENTS

| | | |
|---|---|---|
| JP | 2004-140885 A | 5/2004 |
| JP | 2007-126041 A | 5/2007 |
| JP | 2008-205357 A | 9/2008 |
| JP | 2010-52630 A | 3/2010 |
| JP | 2013-222516 A | 10/2013 |
| JP | 2015153526 A | 8/2015 |
| TW | 201029286 A | 8/2010 |
| WO | 2013/172006 A1 | 11/2013 |
| WO | 2014/153793 A1 | 10/2014 |

OTHER PUBLICATIONS

Office Action issued in counterpart Chinese Patent Application No. 201510589747X, dated Jun. 27, 2017 (22 pages).
Preliminary Search Report issued in French Application No. 1558696, dated Aug. 17, 2018 (6 pages).
Notification of Reasons for Refusal issued in Japanese Application No. 2015-147799, dated Mar. 19, 2019 (14 pages).

* cited by examiner

30r

30s

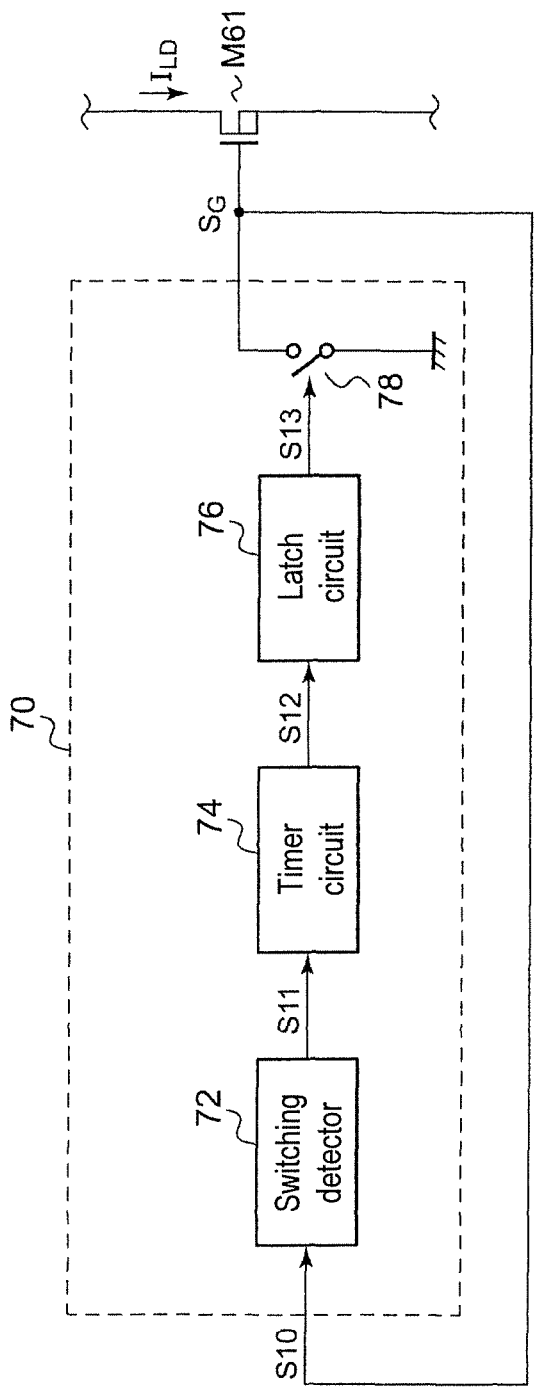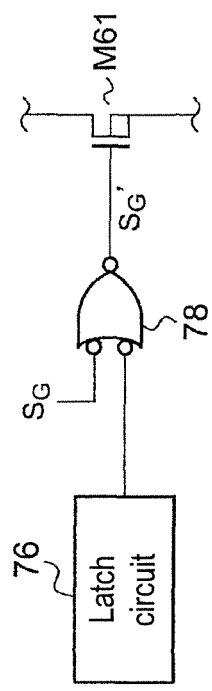
FIG. 13A
FIG. 13B

LIGHTING CIRCUIT AND VEHICLE LAMP HAVING THE SAME

CROSS REFERENCE TO RELATED APPLICATION(S)

This application is a continuation application of U.S. patent application Ser. No. 14/855,439 filed Sep. 16, 2015, which is based on and claims priority under 35 U.S.C. § 119 to Japanese Patent Application Nos. 2014-187991 (filed on Sep. 16, 2014), 2014-263103 (filed on Dec. 25, 2014) and 2015-147799 (filed on Jul. 27, 2015), the entire contents of which are incorporated herein by reference.

BACKGROUND

Field

Exemplary embodiments of the invention relate to a vehicle lamp for use in an automobile or the like, and in particular relate to an overcurrent protection circuit.

Related Art

Hitherto, halogen lamps and high intensity discharge (HID) lamps have prevalently been used as light sources for vehicle lamps, and in particular for headlamps. Recently, the development of semiconductor light sources, such as light emitting diodes (LEDs) is progressing as an alternative.

For example, JP 2004-140885 A (corresponding to US 2004/0070374 A1) describes a vehicle lamp that includes a laser diode (also referred to as a "semiconductor laser") and a phosphor instead of LEDs in order to further improve visibility. In JP 2004-140885 A, the phosphor is irradiated with ultraviolet light that is excitation light emitted from a laser diode. The phosphor generates white light upon receiving the ultraviolet light. The white light generated by the phosphor is emitted ahead of the vehicle lamp, to thereby form a specific light distribution pattern.

FIG. 1 is a circuit diagram of a vehicle lamp 1r studied by the inventor. A light source 2 includes a laser diode 3. A lighting circuit 10r includes a boost converter (step-up DC/DC converter) that receives and steps up a power source voltage $V_{BAT}$ from a battery. A drive circuit 20r includes an inductor L21, a switching transistor M21, a rectifier diode D21, and an output capacitor C21. A controller 22 executes feedback control for the duty ratio of the switching transistor M21 so that a current $I_{LD}$ flowing into the laser diode 3 matches a target current.

The laser diode 3 has little ability to withstand overcurrent. There is a concern that the reliability of the laser diode 3 may deteriorate if supplied with an overcurrent. Overcurrent may occur in the vehicle lamp in, for example, the following circumstances.

In consideration of maintainability, there is a case where the laser diode 3 is connected to the lighting circuit 10r so as to be replaceable. More specifically, the laser diode 3 may be connected to the lighting circuit 10r through a connector. There is a concern that if a connection point of the connector might fluctuate between a contact state and a non-contact state (chattering), charge stored in the output capacitor C21 of the drive circuit 20r might flow into the laser diode 3 at the moment when the connection point is restored to the contact state, which may generate an overcurrent.

In a normal state without disturbance, the drive circuit 20r performs a switching operation at a given fixed duty ratio. When the power source voltage $V_{BAT}$ increases rapidly, it is necessary to lower the duty ratio immediately in order to keep the drive current (lamp current) $I_{LD}$ flowing into the laser diode 3 constant. However, there is a concern that due to delay in the feedback loop, switching takes places at a large duty ratio immediately before fluctuation of the power source voltage, excessive energy is stored in the inductor, and energy is supplied to the laser diode 3 as an overcurrent.

Such issues do not only arise in boost converters, but may also arise in a circuit system which drives the laser diode 3 using a power source having a topology including an inductor or a transformer, and an output capacitor, such as a buck converter (step down DC/DC converter), a Cuk converter, a Zeta converter, a flyback converter, or a forward converter. Similar issues may also arise in a circuit system that drives the laser diode 3 using a linear regulator. Overcurrent protection is also important in situations where an LED is used as the light source 2 instead of a laser diode 3.

SUMMARY

The inventor investigated inserting an overcurrent protection (OCP) circuit between the drive circuit 20r and the laser diode 3 so as to suppress an overcurrent. FIGS. 2A and 2B are circuit diagrams of OCP circuits investigated by the inventor. In the circuits of FIGS. 2A and 2B, a transistor 180 is provided on a path of the lamp current $I_{LD}$, and a resistance value of the transistor 180 continuously increases with increasing the lamp current $I_{LD}$. That is, the transistor 180 acts as a variable resistor element.

An OCP circuit 30r of FIG. 2A includes the transistor 180 and a resistor R31, which are provided on the path of the lamp current $I_{LD}$, and an error amplifier 182. A power source 184 generates a threshold voltage $V_{TH}$. The error amplifier 182 amplifies an error between a voltage drop $V_S$ occurring across the sense resistor R31 and the threshold voltage $V_{TH}$, and then outputs the amplified error to the gate of the transistor 180. In the OCP circuit 30r, in a state where $V_S<V_{TH}$, an output voltage (the gate voltage of the transistor 180) $V_G$ of the error amplifier 182 is lowered to be close to the ground voltage (0V). Thus, the transistor 180 is fully switched to ON.

The lamp current $I_{LD}$ increases in the overcurrent state. If $V_S>V_{TH}$, then the output voltage $V_G$ of the error amplifier 182 increases, the gate-source voltage of the transistor 180 approaches zero, the resistance value of the transistor 180 increases, and the lamp current $I_{LD}$ is suppressed.

However, phase compensation to stabilize the control system introduces a non-negligible response delay into the error amplifier 182. Thus, when there is a sudden change from the normal lighting state ($V_S<V_{TH}$) to the overcurrent state ($V_S>V_{TH}$), the gate voltage $V_G$ of the transistor 180 cannot be raised instantly from a turning-ON level (0 V) up to a turn-OFF level, so that an overcurrent flows.

In an OCP circuit 30s of FIG. 2B, a voltage drop $V_S$ of a sense resistor 31 is introduced between the base and emitter of a bipolar transistor 186. A potential $V_G$ at a connection point between the transistor 186 and a resistor 188 is input to the gate of the transistor 180. In the normal lighting state, the transistor 186 is OFF, and current does not flow into the resistor 188. Therefore, the gate voltage $V_G$ of the transistor 180 is lowered, and the transistor 180 is fully turned ON. In the overcurrent state, the transistor 186 is turned ON, current flows to the resistor 188, the gate voltage $V_G$ of the transistor 180 rises, the resistance value of the transistor 180 increases, and overcurrent can be suppressed.

However, there is not a large difference between the lamp current $I_{LD}$ in the normal lighting state and the maximum rated current of the laser diode 3 (that is, a threshold value for overcurrent protection) in the vehicle lamp. Therefore, the voltage drop $V_S$ of the sense resistor R31 is large in the normal lighting state, and a power loss is large. Also, the overcurrent threshold value fluctuates with temperature since a voltage between the base and emitter of the bipolar transistor 186 has temperature dependent characteristics.

Exemplary embodiments of the invention have been made in view of the above circumstances, and some of the exemplary embodiments provide a lighting circuit capable of suppressing overcurrent supplied to the light source.

(1) According to one exemplary embodiment, a lighting circuit for a light source includes a drive circuit and an overcurrent protection circuit. The drive circuit supplies power to the light source. The overcurrent protection circuit is inserted between the drive circuit and the light source. The overcurrent protection circuit restricts a lamp current flowing into the light source so that the lamp current does not exceed an overcurrent threshold value. The overcurrent protection circuit includes a transistor, an inductor, a rectifier, a current sensor and an overcurrent protection controller. The current sensor generates a current detection signal according to the lamp current. The overcurrent protection controller controls ON/OFF of the transistor based on the current detection signal and the overcurrent threshold value. The transistor, the inductor and the rectifier are disposed in a T-shape.

In this overcurrent protection circuit, the transistor is switched ON in the normal lighting state where the lamp current is smaller than the overcurrent threshold value. Also, in an overcurrent state where the lamp current is larger than the overcurrent threshold value, the transistor is switched OFF, and a current path from the drive circuit to the light source is interrupted. That is, the transistor is used as a switch, rather than as a variable resistor element. Thus, a high speed overcurrent protection circuit can be realized. Also, low power loss can be achieved in the normal lighting state. Furthermore, the inductor can suppress fluctuations in the lamp current. Therefore, even if a delay arises in turning OFF the transistor, an overcurrent can be suppressed. In addition, a counter electromotive force that is generated when the transistor is switched OFF can be clamped by the rectifier.

(2) In the lighting circuit of (1), if the current detection signal exceeds an upper threshold value which is determined according to the overcurrent threshold value, the overcurrent protection controller may switch the transistor OFF. If the current detection signal drops below a lower threshold value which is determined according to the overcurrent threshold value, the overcurrent protection controller may switch the transistor ON.

(3) In the lighting circuit of (2), the overcurrent protection controller may include a hysteresis comparator and a driver. The hysteresis comparator receives the current detection signal at a first input terminal thereof. The hysteresis comparator receives a predetermined threshold value voltage at a second input terminal thereof. The hysteresis comparator generates a protection signal indicating a comparison result. The driver controls the transistor according to the protection signal.

(4) In the lighting circuit of (1), if the current detection signal exceeds a threshold value level that is determined according to the overcurrent threshold value, the overcurrent protection controller may immediately switch the transistor OFF. If the current detection signal falls below the threshold value level, the overcurrent protection controller may switch the transistor ON after a predetermined delay time elapses.

(5) In the lighting circuit of (4), the overcurrent protection controller may include a comparator and a first timer circuit. The comparator receives the current detection signal at a first input terminal thereof. The comparator receives a predetermined threshold value voltage at a second input terminal thereof. The comparator generates a protection signal which is asserted when the current detection signal exceeds the threshold value voltage. The first timer circuit delays an edge, corresponding to transition from an asserted level to a negated level, of the protection signal by the delay time.

(6) In the lighting circuit of any one of (1) to (5), the transistor and the inductor may be provided in series between a positive output of the drive circuit and a positive electrode of the light source. The rectifier may be provided between (i) a connection point between the transistor and the inductor and (ii) a power source line that connects a negative output of the drive circuit and a negative electrode of the light source.

(7) In the lighting circuit of (3), the transistor may be a P-channel MOSFET. The overcurrent protection controller may further include a voltage source. The voltage source receives a voltage from the drive circuit. The voltage source generates a voltage which is obtained by shifting the received voltage to a low potential side by a specific amount. The voltage source supplies the generated voltage to a lower side power source terminal of the driver.

(8) In the lighting circuit of any one of (1) to (5), the transistor and the inductor may be provided in series between a negative output of the drive circuit and a negative electrode of the light source. The rectifier may be provided between (i) a connection point between the transistor and the inductor and (ii) a power source line that connects a positive output of the drive circuit to a positive electrode of the light source.

(9) In the lighting circuit of any one of (1) to (8), the overcurrent protection controller may include an OFF-latch circuit that fixes the transistor OFF when a state continues for a predetermined time where the transistor repeatedly switches ON and OFF.

If a failure occurs in a switching transistor due to a short circuit in a case where the drive circuit is a switching converter, if a failure occurs in an output transistor due to a short circuit in a case where the drive circuit is a linear regulator, or if a feedback circuit of the drive circuit fails, control over the drive current supplied to the light source is lost, and the overcurrent state becomes continuous. When the overcurrent state has been continuous for a long period of time, the exemplary embodiment assumes that there is failure of the circuit and fixes the transistor of the overcurrent protection circuit to be OFF. Thereby, the light source is turned off, and safety can be improved.

(10) In the lighting circuit of (9), the OFF-latch circuit may monitor a signal to instruct ON/OFF switching of the transistor.

(11) In the lighting circuit of any one of (9) to (10), the OFF-latch circuit may include a switching detector, a second timer circuit and a forced-OFF circuit. The switching detector generates a switching detection signal which adopts a first state when the transistor is steadily ON, and a second state when the transistor repeatedly switches ON and OFF. The second timer circuit asserts a suspension signal when the second state of the switching detection signal has continues for the specific time. The forced-OFF circuit forcibly switches the transistor OFF when the suspension signal is asserted.

(12) The lighting circuit of any one of (1) to (11) may further include an abnormality detector. The abnormality detector optically monitors the light source. The abnormality detector asserts an abnormality detection signal when an intensity of the light source exceeds a permitted level in a low luminance mode in which the light source is lit at an intensity lower than an ordinarily level. The transistor is switched OFF when the abnormality detection signal is asserted.

(13) According to another exemplary embodiment, a lighting circuit for a light source includes a drive circuit, an abnormality detector, and a protection circuit. The drive circuit supplies power to the light source. The abnormality detector optically monitors the light source. The abnormality detector asserts an abnormality detection signal when an intensity of the light source exceeds a permitted level in a low luminance mode in which the light source is lit at an intensity lower than an ordinarily level. The protection circuit restricts power supply to the light source from the drive circuit when the abnormality signal is being asserted.

With this configuration, emission of strong light can be prevented under conditions and/or in usage situations where light intensity should be reduced.

For example, the low luminance mode may be a test mode in which the light source 2 is caused to weakly emit light for the purpose of light axis adjustments, testing, or maintenance. Thereby, safety of operators during maintenance can be improved.

(14) The light circuit of (13) may further include an emission light detector that optically detects as to whether or not the light source is lit normally. The abnormality detector may assert the abnormality detection signal when the emission light detector indicates normal lighting in the low luminance mode.

With semiconductor light sources such as laser diodes, sometimes there is a failure mode in which light ceases to be emitted (catastrophic optical damage (COD)) even through the electrical characteristics thereof are normal. Therefore, an emitted light detector which optically detects light emitted from the laser diode may be employed in a vehicle lamp including a laser diode. A detection threshold value of the emitted light detector may be set at a level higher than that permitted in the low light mode. Thereby, an output of the emitted light detector can also be utilized in abnormality detection by an abnormality detector. Also, an increase in circuit surface area can be suppressed.

(15) According to further another exemplary embodiment, a vehicle lamp includes a light source, and the lighting circuit of any one of (1) to (14) that drives the light source.

The light source may include a laser diode and a phosphor. The laser diode emits excitation light. The phosphor emits fluorescence upon excitation by the excitation light. The light source generates white output light including spectra of the excitation light and the fluorescence According to the exemplary embodiments described above, a circuit can be protected from sudden overcurrent.

BRIEF DESCRIPTION OF THE DRAWINGS

FIGS. 13A and 13B are block diagrams of an OFF-latch circuit;

DETAILED DESCRIPTION

Figure 1:
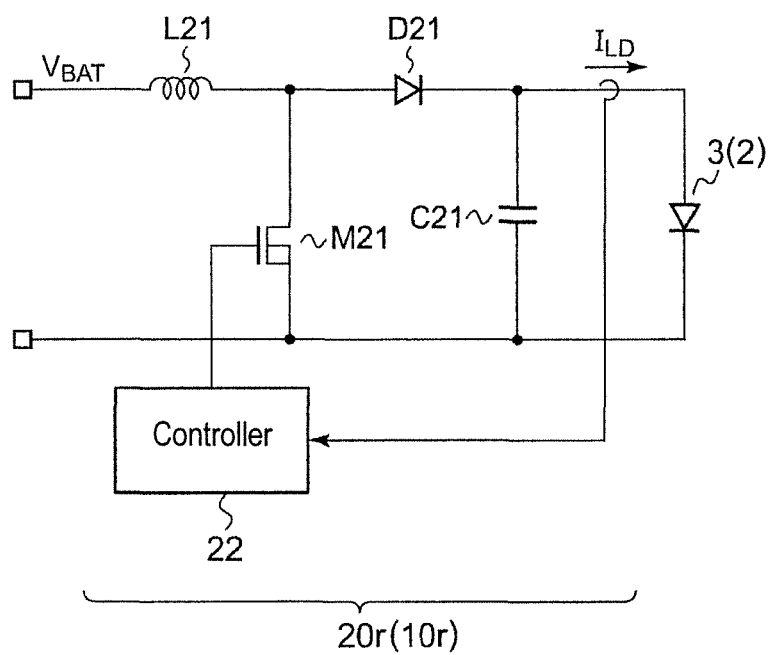
FIG. 1 is a circuit diagram of a lighting circuit of a light source investigated by the inventor.

Exemplary embodiments of the invention will be described below with reference to the accompanying drawings. Same or equivalent constituent elements, members, and processing shown in the respective drawings are given the same reference numerals, and redundant explanation thereof will be omitted. Moreover, the embodiments are merely examples, and do not limit the invention. All of the features described in the following exemplary embodiments and combinations thereof are not always essential to the invention.

In the present specification, a "member A is in a state where the member A is connected to a member B" includes a case where the member A and the member B are directly connected together physically, and a case where the member A and the member B are indirectly connected together through another member so long as (i) there is no substantial impact on the electrical connection state thereof or (ii) there is no detriment to functionality and effects provided by the connection therebetween.

Similarly, a "member C is in a state where the member C is provided between a member A and a member B" includes a case where the member A is directly connected to the member B, a case where the member B is directly connected to the member C, and a cases where indirect connection is made through another member so long as (i) there is no substantial impact on the electrical connection state thereof or (ii) there is no detriment to functionality and effects exhibited provided by the connection therebetween.

In the present specification, symbols given to electrical signals such as voltage signals and current signals, and to circuit elements such as resistors and capacitors, respectively represent voltage values and current values, or resistance values and capacitance values, as required.

A person of ordinary skill in the art would appreciate that it is possible to substitute bipolar transistors, MOSFETs, and insulated gate bipolar transistors (IGBTs) with each other, to switch P-channel transistors (PNP-type) and N-channel transistors (NPN-type), and to electrically reverse a power source and the ground.

First Exemplary Embodiment

Figure 3:
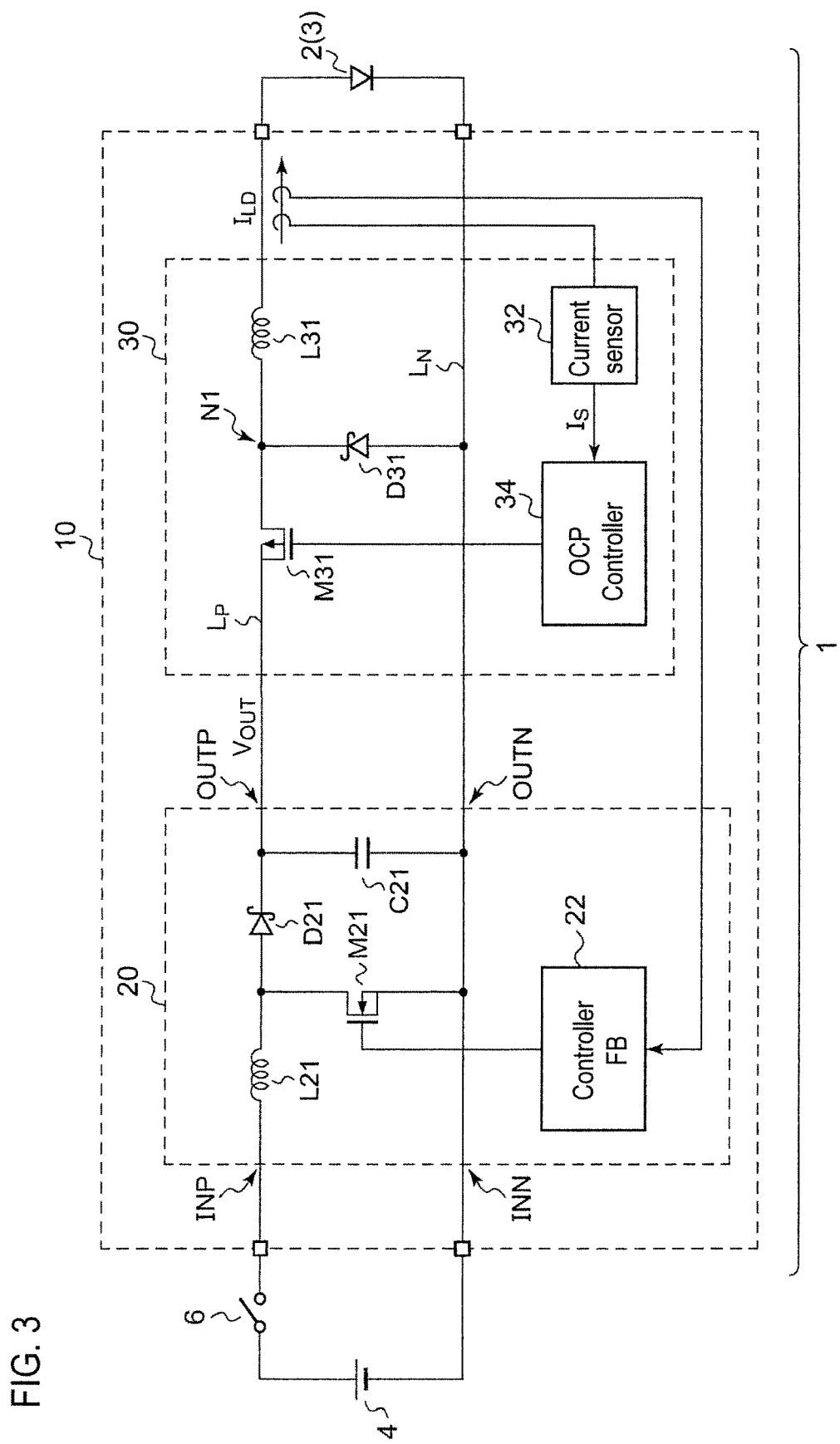
FIG. 3 is a circuit diagram of a vehicle lamp according to a first exemplary embodiment.

FIG. 3 is a circuit diagram of a vehicle lamp 1 according to a first exemplary embodiment. The vehicle lamp 1 includes a light source 2 and a lighting circuit 10 that drives the light source 2.

For example, the light source 2 may include a laser diode 3 and a phosphor (not shown in the drawings). The laser diode 3 emits excitation light. The phosphor emits fluorescent light upon excitation by the excitation light. The light source is configured to generate white output light including spectra of the excitation light and the fluorescent light. Alternatively, the light source 2 may include a white LED, or a combination of red, green, and blue LEDs. When a switch 6 is switched from OFF to ON, the lighting circuit 10 is applied with a voltage $V_{BAT}$ from a battery 4, and steps up and supplies the voltage $V_{BAT}$ to the light source 2.

The lighting circuit 10 includes a drive circuit 20 and an OCP circuit 30. The drive circuit 20 executes feedback control for the power supplied to the light source 2. In the first exemplary embodiment, the drive circuit 20 is a current control step-up converter (boost converter). The drive circuit 20 includes an inductor L21, a switching transistor M21, a rectifying diode D21, an output capacitor 21, and a controller 22. The controller 22 detects a lamp current $I_{LD}$ supplied to the light source 2, generates a gate pulse whose duty ratio is adjusted so as to approach a target current $I_{REF}$ that is given according to a target luminance of the light source 2, and drives the switching transistor M21. An output voltage $V_{OUT}$ generated across the output capacitor C21 is supplied to the light source 2 through the OCP circuit 30.

The OCP circuit 30 is inserted between the drive circuit 20 and the light source 2. The OCP circuit 30 restricts the current $I_{LD}$ flowing into the light source 2 so that the current $I_{LD}$ does not exceed an overcurrent threshold value $I_{TH}$. The overcurrent threshold value $I_{TH}$ is set to be larger than a maximum value of the target current $I_{REF}$ and to be smaller than a maximum rated current of the laser diode 3.

The OCP circuit 30 includes a transistor M31, an inductor L31, a rectifier D31, a current sensor 32, and an OCP controller 34. The transistor M31, the inductor L31, and the rectifier D31 are disposed in a T-shape. In the first exemplary embodiment, the transistor M31 and the inductor L31 are provided in series on a path of a power source line $L_P$ that connects a positive electrode output OUTP of the drive circuit 20 and a positive electrode (anode) of the light source 2. The rectifier D31 is provided between (i) a connection point N1 between the transistor M31 and the inductor L31 and (ii) a power source line $L_N$ that connects a negative electrode output OUTN of the drive circuit 20 and a negative electrode (cathode) of the light source 2. Although a diode is suitably employed as the rectifier D31, a FET may be employed instead of a diode, and the FET may be caused to switch complementary to the transistor M31.

The current sensor 32 generates a current detection signal $I_S$ according to the lamp current $I_{LD}$ flowing into the light source 2. The OCP controller 34 controls ON/OFF switching of the transistor M31 based on the current detection signal $I_S$ and the overcurrent threshold value $I_{TH}$.

More specifically, the OCP controller 34 switches the transistor M31 OFF if the current detection signal $I_S$ exceeds an upper threshold value $I_{THH}$ that is determined according to the overcurrent threshold value $I_{TH}$. Also the OCP controller 34 switches the transistor M31 ON if the current detection signal $I_S$ is below a lower threshold value $I_{THL}$ that is determined according to the overcurrent threshold value $I_{TH}$.

The above is the basic configuration of the vehicle lamp 1.

Figure 4:
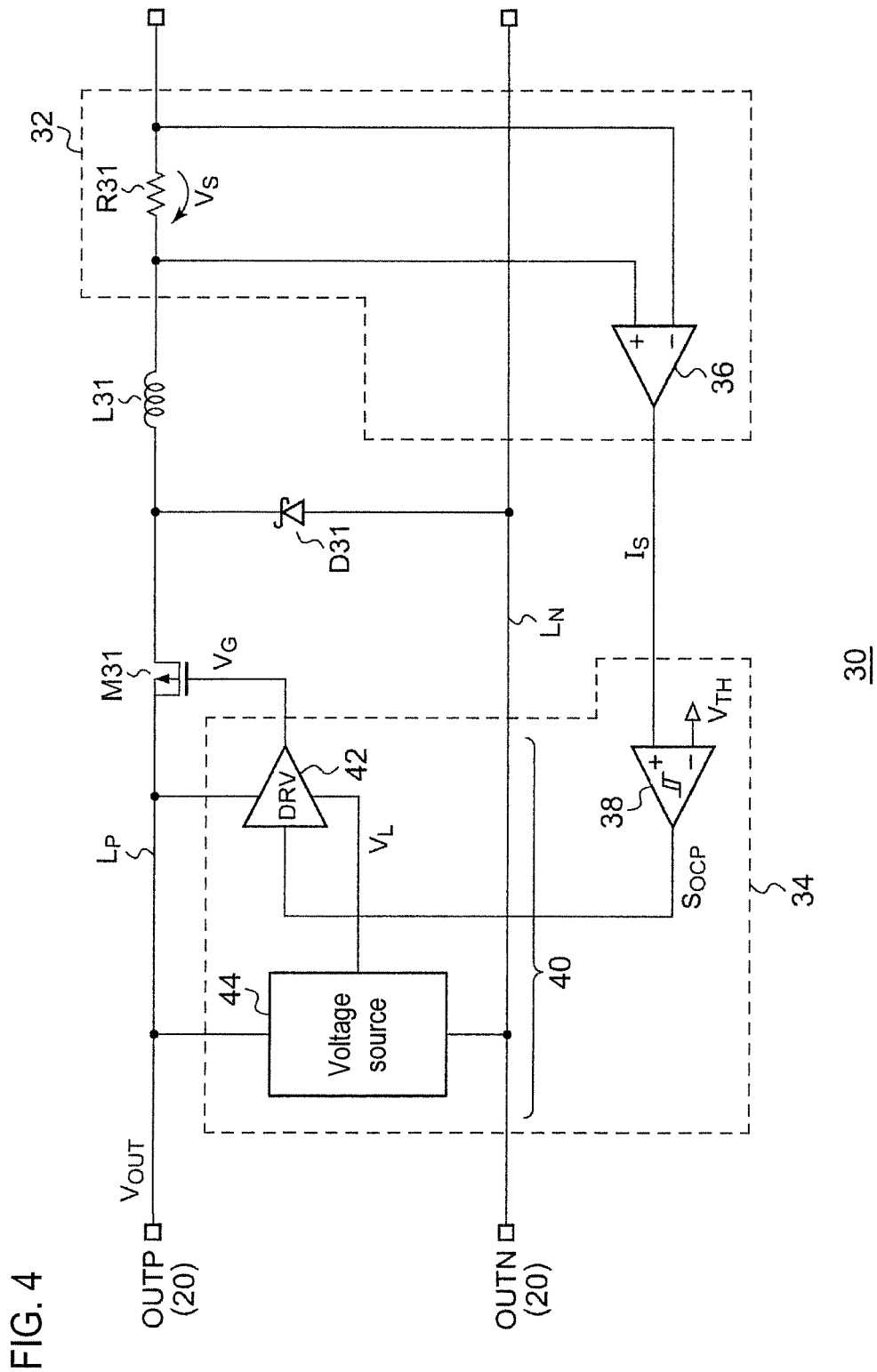
FIG. 4 is a circuit diagram showing an example of a specific configuration of an OCP circuit.

FIG. 4 is a circuit diagram showing an example of a specific configuration of the OCP circuit 30. The current sensor 32 includes the sense resistor R31 for current detection and an amplifier 36. The sense resistor R31 is provided on the path of the power source line $L_P$ along which the output voltage $V_{OUT}$ is supplied from the drive circuit 20 in the previous stage. The amplifier 36 amplifies the voltage drop $V_S$ across the sense resistor R31. An output of the amplifier 36 is the current detection signal $I_S$ which changes linearly with respect to the lamp current $I_{LD}$. It is noted that the amplifier 36 in FIG. 4 or FIG. 5 may be omitted. Moreover, the sense resistor R31 may be placed on the power source line $L_N$ instead of on the power source line $L_P$. The sense resistor R31 may be employed as a current detection resistor for detecting the lamp current $I_{LD}$ when feedback control is executed for the lamp current ILD in a normal lighting state.

The OCP controller 34 mainly includes a hysteresis comparator 38 and a level shifter 40. A first input terminal (+) of the hysteresis comparator 38 receives the current detection signal $I_S$. A second input terminal (−) of the hysteresis comparator 38 receives the predetermined threshold value $V_{TH}$. The level shifter 40 appropriately shifts a level of an output signal (also referred to as a "protection signal") $S_{OUP}$ of the hysteresis comparator 38, and controls ON/OFF of the transistor M31. The upper threshold value $I_{THH}$ and the lower threshold value $I_{THL}$ are set in the hysteresis comparator 38 according to the threshold value $V_{TH}$. If $I_S > I_{THH}$, the hysteresis comparator 38 sets its output $S_{OCP}$ to be a high level. If $I_S < I_{THL}$, the hysteresis comparator 38 sets its output $S_{OCP}$ to a low level. The level shifter 40 switches the transistor M31 OFF when the protection signal $S_{OCP}$ is the high level. Also, the level shifter 40 switches the transistor M31 ON when the protection signal $S_{OCP}$ is the low level.

The transistor M31 is, for example, a P-channel MOSFET. When the protection signal $S_{OCP}$ is a low level, the level shifter 40 sets a gate voltage $V_G$ of the transistor M31 to a low level to thereby switch the transistor M31 ON. Also, when the protection signal $S_{OCP}$ is a high level, the level shifter 40 sets the gate voltage $V_G$ of the transistor M31 to a high level to thereby switch the transistor M31 OFF.

Reliability is impacted if the gate-source voltage of the transistor M31 exceeds the withstand voltage thereof when a low level voltage is being applied to the gate of the transistor M31. Thus, the level shifter 40 includes a driver 42 and a voltage source 44. The voltage source 44 receives the voltage $V_{OUT}$ from the drive circuit 20, generates a voltage $V_L$ that is obtained by shifting the voltage $V_{OUT}$ downward by a specific amount, and supplies the voltage $V_L$ to a lower side power source terminal of the driver 42. A low level output of the driver 42 becomes the voltage $V_L$.

Figure 5:
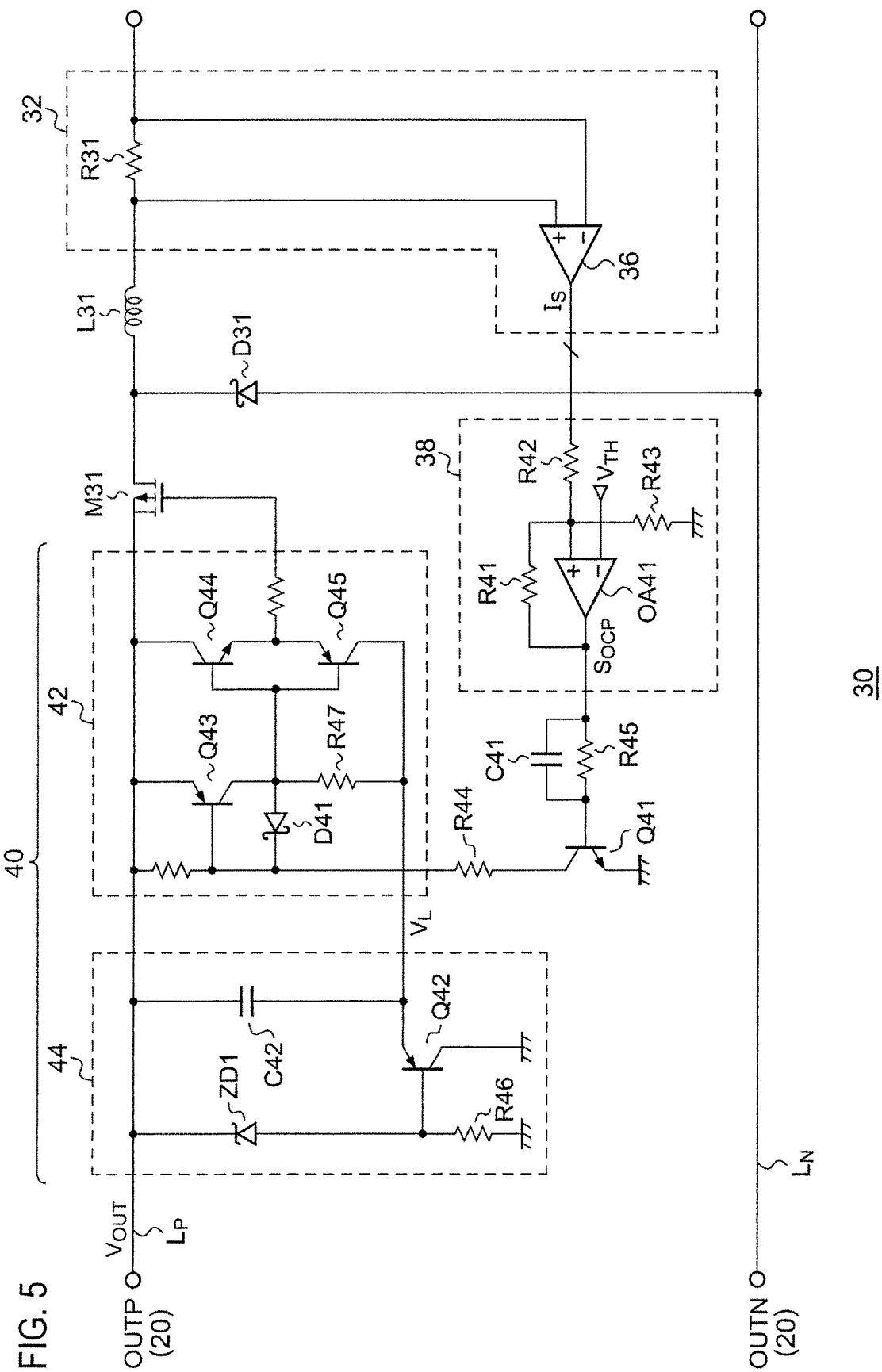
FIG. 5 is a circuit diagram showing an example of a specific configuration of the OCP circuit of FIG. 4.

FIG. 5 is a circuit diagram showing an example of a specific configuration of the OCP circuit 30 of FIG. 4. The hysteresis comparator 38 includes an operational amplifier OA41, and resistors R41 to R43. The hysteresis comparator 38 inputs to the driver 42 through a transistor Q41 and a resistor R44. A capacitor C41 and a resistor R45 are inserted for the purpose of high-speed switching of the transistor Q41.

The voltage source 44 includes a Zener diode ZD1, a capacitor C42, a transistor Q42, and a resistor R46. $V_L=V_{OUT}-V_Z+V_F$ is generated by the voltage source 44 where $V_Z$ denotes the Zener voltage, and $V_F$ denotes a base-emitter voltage of the transistor Q42. The driver 42 includes transistors Q43 to Q45, a diode D41, and a resistor R47.

The voltage $V_L$ from the voltage source 44 is supplied to the lower side power source terminal of the driver 42. The transistor Q43 can be switched at a higher speed because of Schottky clamping by the diode D41. Current amplification by the transistors Q45 and Q42 make it possible to switch the transistor M31 at a higher speed.

The respective configurations of the level shifter 40, the current sensor 32, and the hysteresis comparator 38 are not limited to the example shown in FIG. 5. As will be understood by a person of ordinary skill in the art, there are various modified examples, and these modified examples are also included in the scope of the invention.

The OCP circuit 30, the lighting circuit 10 including the OCP circuit 30 and the vehicle lamp 1 including the OCP circuit 30 have been described above. Operations of the OCP circuit 30, the lighting circuit 10, and the vehicle lamp 1 will be described below.

Figure 6B:
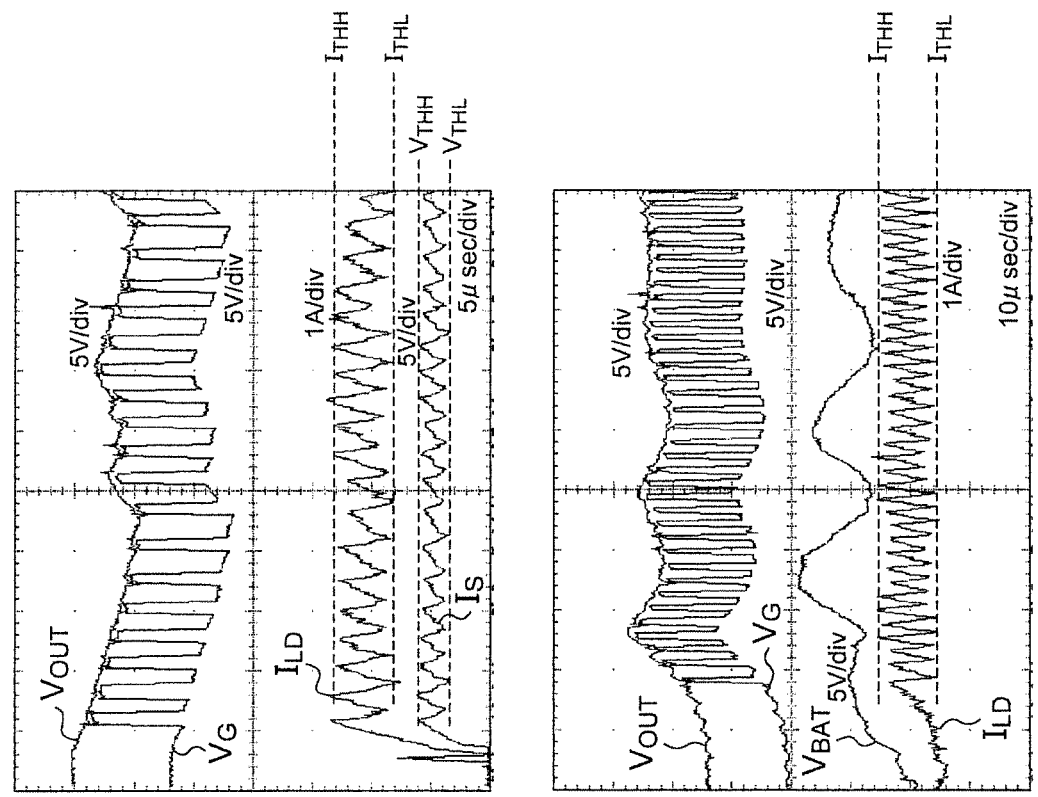
FIG. 6B shows operational waveforms of the lighting circuits of FIGS. 3-5.
Figure 6A:
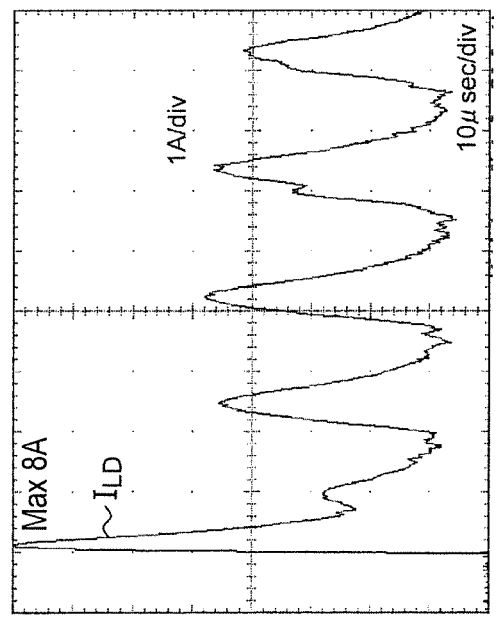
FIG. 6A shows operation waveforms of the lighting circuit of FIG. 1.

FIG. 6B is operation waveforms of the lighting circuit 10. For the purpose of clarifying the effect of the OCP circuit 30, FIG. 6A shows operation waveforms of the lighting circuit 10r of FIG. 1 which does not include the OCP circuit 30. Upper portions of FIGS. 6A and 6B show waveforms at a time when the connector between the lighting circuit 10 and the light source 2 is restored from a non-contact state to a contact state. Also, lower portions of FIGS. 6A and 6B show waveforms that appear when the power source voltage $V_{BAT}$ rapidly changes from 9V to 16V.

Refer to the upper portions of FIGS. 6A and 6B. As shown in FIG. 6A, in a case where the OCP circuit 30 is not provided, when the connector is restored from the non-contact state to the contact state, the lamp current $I_{LD}$ becomes an overcurrent of a maximum of 8 A. In contrast, as shown in FIG. 6B, providing the OCP circuit 30 makes it possible to keep the lamp current $I_{LD}$ be between the upper threshold value $I_{THH}$ and the lower threshold value $I_{THL}$, and an overcurrent can be suppressed.

Next, refer to the lower portions of FIGS. 6A and 6B. As shown in FIG. 6A, in the case where the OCP circuit 30 is not provided, when the power source voltage $V_{BAT}$ rapidly increases from 9V to 16V, the lamp current $I_{LD}$ becomes an overcurrent of a maximum of 5 A. In contrast, as shown in FIG. 6B, providing the OCP circuit 30 makes it possible to keep the lamp current $I_{LD}$ be between the upper threshold value $I_{THH}$ and the lower threshold value $I_{THL}$, and an overcurrent can be suppressed.

The operation of the lighting circuit 10 has been described above.

Thus, according to the lighting circuit 10, the transistor M31 is switched ON in the normal lighting state where lamp current $I_{LD}$ is smaller than the overcurrent threshold value $I_{TH}$. Also, in an overcurrent state where the lamp current $I_{LD}$ is larger than the overcurrent threshold value $I_{TH}$, the transistor M31 is switched OFF to thereby interrupt the current path from the drive circuit 20 to the light source 2. That is, since the transistor M31 is used as a switch instead of as a variable resistor element, high-speed overcurrent protection can be realized. Moreover, since the transistor M31 is switched to fully ON in the normal lighting state, power loss can also be reduced.

Moreover, providing the inductor L31 makes it possible to suppress fluctuations in the lamp current $I_{LD}$. Therefore, even in cases where a delay occurs in turning OFF of the transistor M31, an overcurrent can be suppressed. Moreover, when the transistor M31 is switched OFF, counter electromotive force can also be clamped by the rectifier D31.

Moreover, the current detection signal $I_S$ corresponding to the lamp current $I_{LD}$ is compared with the two threshold values $I_{THH}$, $I_{THL}$ that exhibit hysteresis, and the transistor M31 is switched according to the comparison result. This makes it possible to achieve stabilized overcurrent protection.

In this lighting circuit 10, since the threshold values $I_{TH}$ ($I_{THH}$, $I_{THL}$) are set higher than the target current $I_{REF}$, the OCP circuit 30 does not operate in the normal lighting state. Therefore, it is guaranteed to put a priority on the current control feedback loop of the drive circuit 20.

Second Exemplary Embodiment

Figure 7:
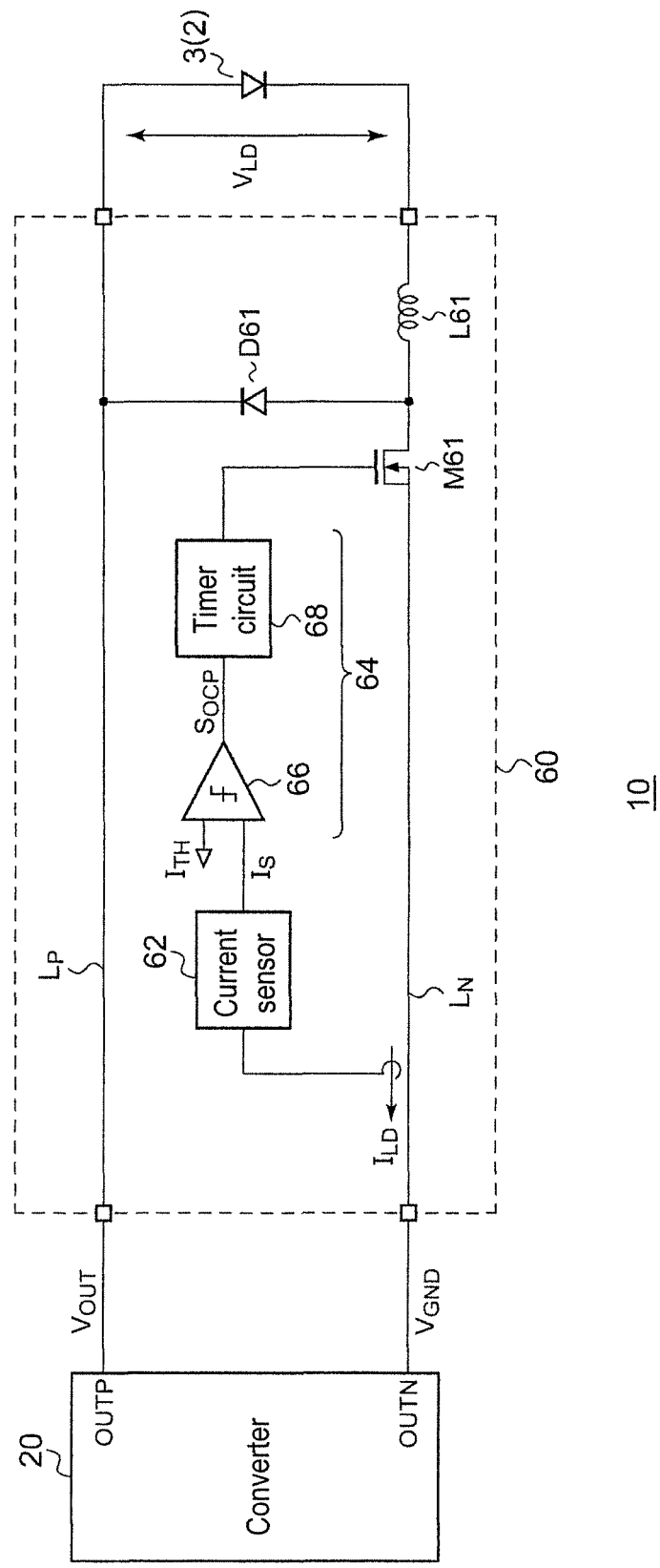
FIG. 7 is a circuit diagram of an OCP circuit according to a second exemplary embodiment.

FIG. 7 is a circuit diagram of an OCP circuit according to a second exemplary embodiment. An OCP circuit 60 includes a transistor M61, an inductor L61, a rectifier D61, a current sensor 62, and an OCP controller 64. The transistor M61, the inductor L61, and the rectifier D61 are disposed in a T-shape similarly to in the first exemplary embodiment. In the second exemplary embodiment, the transistor M61 and the inductor L61 are provided in series on the path of the power source line $L_N$. A transistor, controlled so as to be switched ON/OFF complementary to the transistor M61, may be used instead of the rectifier D61.

The current sensor 62 detects the lamp current $I_{LD}$ and generates the current detection signal $I_S$ according to the lamp current $I_{LD}$. The OCP controller 64 controls ON/OFF of the transistor M61 based on the current detection signal $I_S$ and the overcurrent threshold value $I_{TH}$.

More specifically, in the second exemplary embodiment, if the current detection signal $I_S$ exceeds the overcurrent threshold value $I_{TH}$, the OCP controller 64 immediately switches the transistor M61 OFF. If the current detection signal $I_S$ drops below the overcurrent threshold value $I_{TH}$, the OCP controller 64 switches the transistor M61 ON after a given delay time τ elapses.

The OCP controller 64 includes a comparator 66 and a first timer circuit 68. The comparator 66 compares the current detection signal $I_S$ with the overcurrent threshold value $I_{TH}$. If Is >$I_{TH}$, the OCP controller 64 generates an asserted protection signal $S_{OCP}$ (for example, a high level).

When the protection signal $S_{OCP}$ transitions from a negated level to an asserted level, the first timer circuit 68 immediately switches the transistor M61 OFF without delay. Conversely, when the protection signal $S_{OCP}$ transitions from the asserted level to the negated level, the first timer circuit 68 switches the transistor M61 ON after a delay of the delay time τ. The first timer circuit 68 can be regarded as a delay circuit that is effective for one edge out of the positive edge and the negative edge of the protection signal $S_{OCP}$, and has no effect for the other edge.

Figure 8:
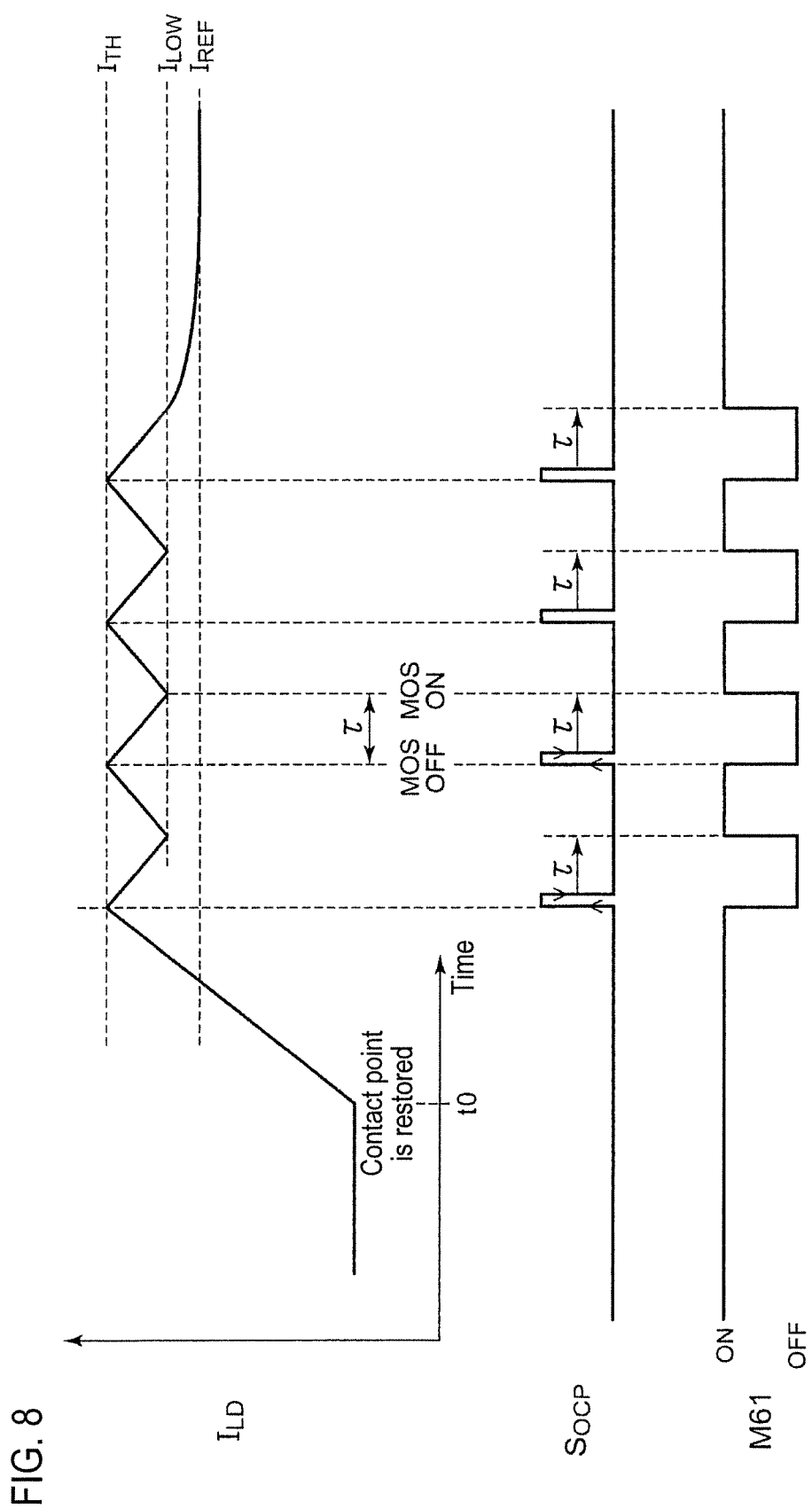
FIG. 8 shows operation waveforms during restoration of a contact point of a connector of the lighting circuit of FIG. 7.

FIG. 8 is operation waveforms of the lighting circuit 10 when the contact of the connector of the lighting circuit 10 of FIG. 7 is restored. The contact is restored at a timing t0.

Thereby, charge stored in an output capacitor C1 of the drive circuit 20 flows into the light source 2, and the lamp current $I_{LD}$ increases sharply.

If the lamp current $I_{LD}$ exceeds the threshold value $I_{TH}$, the protection signal $S_{OCP}$ is asserted (high level in this case) and the transistor M61 is immediately switched OFF. When the transistor M61 is switched OFF, the lamp current $I_{LD}$ begins to decrease through the inductor L61 and the diode D61 and quickly becomes smaller than the threshold value $I_{TH}$, and the protection signal $S_{OCP}$ is negated. Edges corresponding to the protection signal $S_{OCP}$ transitioning from the asserted state to the negated state (negative edges) are delayed by the first timer circuit 68. The transistor M61 is switched back ON after the delay time τ elapses. When the transistor M61 is switched ON, the lamp current $I_{LD}$ begins to increase. The OCP circuit 60 repeats this operation, which makes it possible to restrict the lamp current $I_{LD}$ to values lower than the overcurrent threshold value $I_{TH}$.

A slope of the decrease in the lamp current $I_{LD}$ during the delay time τ depends on the inductor L61 and a voltage $V_{LD}$ across the laser diode 3, and is given by $V_{LD}/L61$. Accordingly, an amount of decrease in the lamp current $I_{LD}$ during the delay time τ is $τ×V_{LD}/L61$. Accordingly, since the delay time τ is determined so that that $I_{LOW}=I_{TH}-τ×V_{LD}/L61>I_{REF}$ is satisfied, the overcurrent protection operates in the normal lighting state, and the transistor M61 can be prevented from switching.

Thus, turning ON of the transistor M61 is delayed by the OCP controller 64 in the second exemplary embodiment, which makes it possible to restrict the lamp current ILD to be values between the threshold values $I_{TH}$ and $I_{LOW}$.

Figure 9:
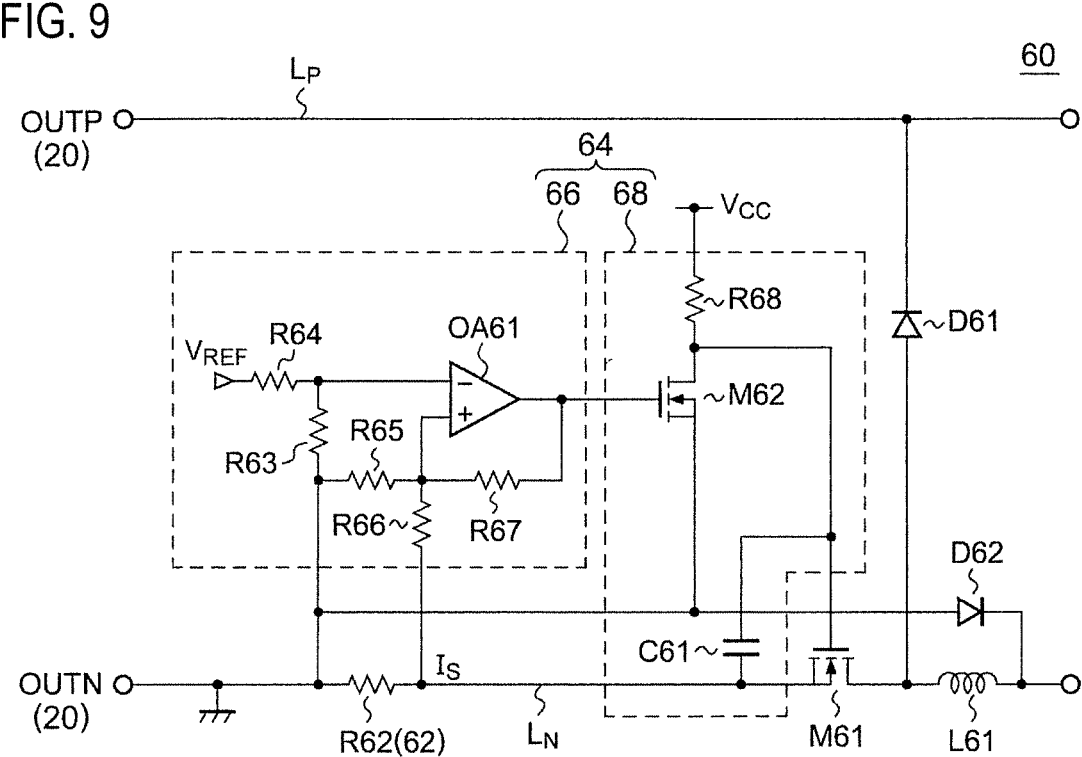
FIG. 9 is a circuit diagram showing an example of a specific configuration of the OCP circuit of FIG. 7.

FIG. 9 is a circuit diagram showing a specific example of a configuration of the OCP circuit 60 of FIG. 7. The current sensor 62 includes a resistor R62 for current detection. The resistor R62 is provided on the path of the lamp current $I_{LD}$. A voltage drop across the resistor R62 is the current detection signal $I_S$. Similarly to the first exemplary embodiment, an amplifier that amplifies the voltage drop across the resistor R62 may be added. The resistor R62 is provided on the power source line $L_N$ which connects the negative electrode output OUTN of the drive circuit 20 in the previous stage and the negative electrode terminal (cathode) of the light source 2. Similarly to the first exemplary embodiment, the resistor R62 may be provided on the power source line $L_P$.

Resistors R63 to R67 and an operational amplifier OA61 make up a hysteresis comparator, and correspond to the comparator 66 shown in FIG. 7. It is noted that this hysteresis serves to prevent chattering and that the hysteresis here is different in technical sense from that of the first exemplary embodiment.

The first timer circuit 68 includes a resistor R68, a transistor M62, and a capacitor C61. The capacitor C61 may employ a gate capacitance of the transistor M61. When the protection signal $S_{OCP}$ is asserted (high level), the transistor M62 is switched ON, the capacitor C61 immediately discharges, the gate-source voltage of the transistor M61 becomes zero, the transistor M61 is switched OFF, and overcurrent protection is enabled.

When the protection signal $S_{OCP}$ is negated (low level), the transistor M62 is switched OFF. The capacitor C61 is charged through the resistor R68 with a given time constant. After a delay time τ corresponding to the time constant elapses, the gate-source voltage of the transistor M61 exceeds a FET threshold value voltage, the transistor M61 is switched ON, and the overcurrent protection is disabled.

A diode D62 is provided for the purpose of clamping the counter electromotive force of the inductor L61 when a connection line between the lighting circuit 10 and the light source 2, and in particular the connector, is in a disconnected state.

The second exemplary embodiment has the following advantageous effect over the first exemplary embodiment.

In the second exemplary embodiment, when the lamp current $I_{LD}$ exceeds the given threshold value $I_{TH}$, the transistor M61 is switched OFF. Thereafter, when the lamp current $I_{LD}$ drops to a level $I_{LOW}$ that is lower than the threshold value $I_{TH}$, the transistor M61 is switched ON. In this sense, the second exemplary embodiment is similar to the first exemplary embodiment. The first and second exemplary embodiments are, however, different in that while the first exemplary embodiment sets the lower side level $I_{LOW}$ using the lower threshold value $I_{THL}$ of the hysteresis comparator, the second exemplary embodiments sets the lower side level $L_{LOW}$ using the delay time τ.

In the OCP circuit 30 of FIG. 4, it is necessary to compare the lamp current $I_{LD}$ with the lower threshold value $I_{THL}$ by the hysteresis comparator 38 in a state where the transistor M31 is in the OFF state. Therefore, the sense resistor R31 cannot be provided on the ground terminal (OUTN) side of the transistor M31. As a result, in order for the hysteresis comparator 38 to perform the voltage comparison using the ground voltage as a reference, it is necessary that the amplifier 36 converts the voltage drop $V_S$ into a current detection signal $I_S$ that is based on the ground voltage serving as a reference. However, since the high speed amplifier 36 is generally expensive, cost might be high in the OCP circuit 30 of FIG. 4.

In contrast, in the second exemplary embodiment, since the timing at which the transistor M61 is turned ON is determined by the first timer circuit 68, the lamp current $I_{LD}$ does not need to be detected during the time when the transistor M61 is OFF. That is, the resistor R62 for detecting the lamp current $I_{LD}$ can be provided on the ground terminal (OUTN) side as shown in FIG. 9. Thus, the current detection signal $I_S$ that is based on the ground voltage serving as the reference can be generated even without the amplifier 36 of FIG. 4. As a result, a cost can be reduced.

Third Exemplary Embodiment

Figure 10:
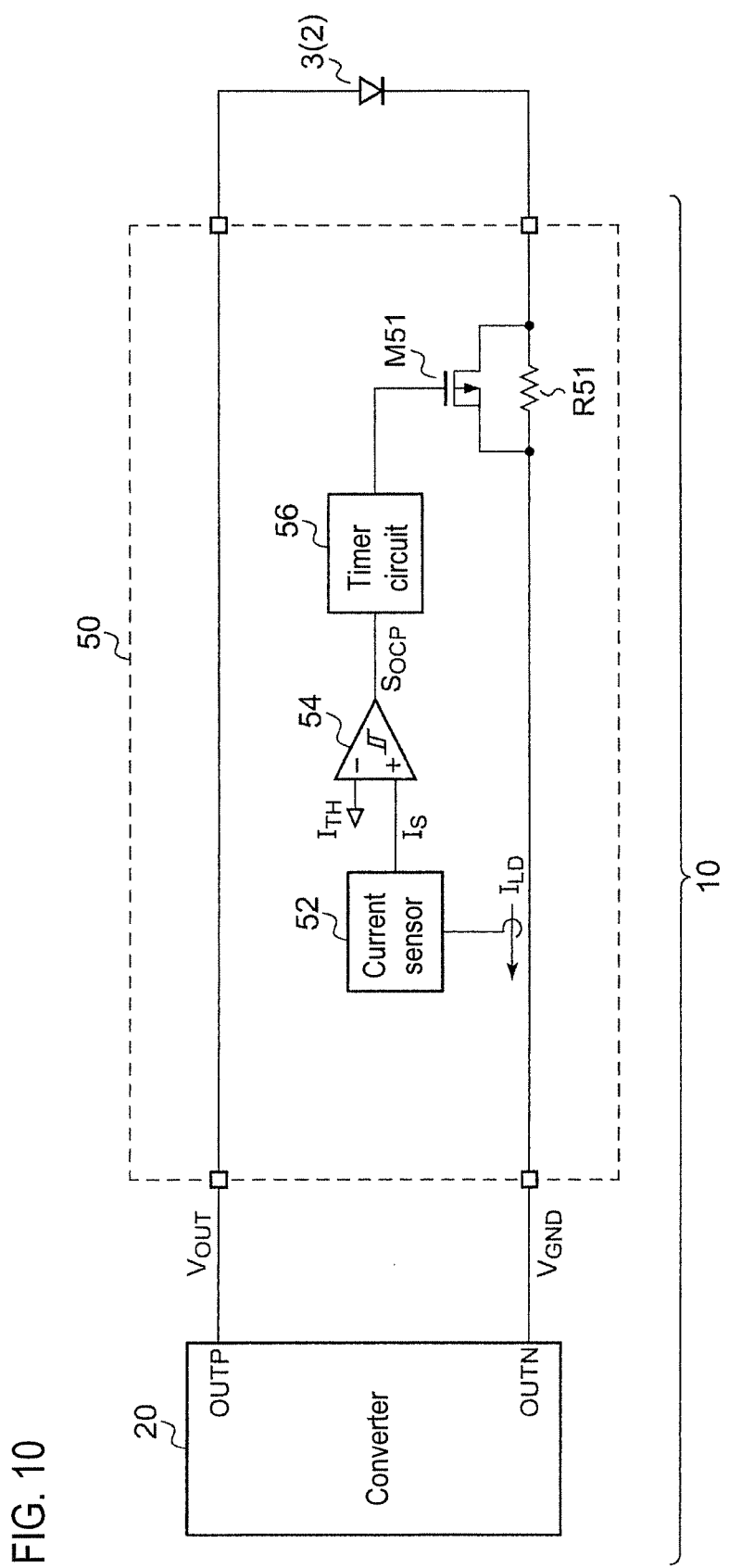
FIG. 10 is a circuit diagram of a lighting circuit provided with an OCP circuit according to a third exemplary embodiment.

FIG. 10 is a circuit diagram of a lighting circuit 10 provided with an OCP circuit according to a third exemplary embodiment. An OCP circuit 50 is inserted between a drive circuit 20 and a laser diode 3 in the third exemplary embodiment.

The OCP circuit 50 includes a current sensor 52, a comparator 54, a timer circuit 56, a bypass transistor M51, and a current restricting resistor R51.

The current sensor 52 detects a lamp current $I_{LD}$ and generates a current detection signal $I_S$ according to the lamp current $I_{LD}$. The comparator 54 compares the current detection signal $I_S$ with the overcurrent threshold value $I_{TH}$, and generates an asserted (for example, high level) protection signal $S_{OCP}$ when $I_S>I_{TH}$. It is preferable that the comparator 54 is a hysteresis comparator.

The current restricting resistor R51 is provided on a path of the lamp current $I_{LD}$. The bypass transistor M51 is provided in parallel to the current restricting resistor R51. The bypass transistor M51 is switched ON during a period in which the protection signal $S_{OCP}$ is negated. Also, the bypass transistor M51 is switched OFF during a period in which the protection signal $S_{OCP}$ is asserted.

The timer circuit 56 is inserted between the bypass transistor M51 and the comparator 54. When the protection signal $S_{OCP}$ transitions from a negated level to an asserted level, the timer circuit 56 immediately switches the bypass transistor M51 OFF without delay. Conversely, when the protection signal $S_{OCP}$ transitions from the asserted level to the negated level, the timer circuit 56 switches the bypass transistor M51 ON after a specific delay time elapses. The timer circuit 56 can be regarded as a delay circuit that takes effect for one edge out of the positive edge and the negative edge of the protection signal $S_{OCP}$, and has no effect for the other edge.

When an overcurrent state of $I_{LD} > I_{TH}$ is detected, the OCP circuit 50 according to the third exemplary embodiment immediately switches the transistor M51 OFF, and overcurrent can be suppressed. Conversely, when a state is returned to a normal lighting state of $I_{LD} < I_{TH}$, the bypass transistor M51 is switched ON after a delay time elapses, the current restricting resistor R51 is bypassed, and the light source 2 can be driven with low power loss.

When the lighting circuit 10 and the connector of the light source 2 are in a non-contact state (separate), the output voltage $V_{OUT}$ of the drive circuit 20 becomes a predetermined voltage $V_{OCV}$. Assuming that $V_L$ denotes the output voltage $V_{OUT}$ of the drive circuit 20 in the normal lighting state, a maximum current $I_{MAX}$ that flows into the light source 2 when the connection point of the connector is restored is obtained by $(V_{OCV} - V_L)/R51$. Accordingly, the laser diode 3 can be suitably protected by determining the resistance value of the resistor R51 so that the maximum current $I_{MAX}$ does not exceed the maximum rated current (permitted current) of the laser diode 3.

Figure 11A:
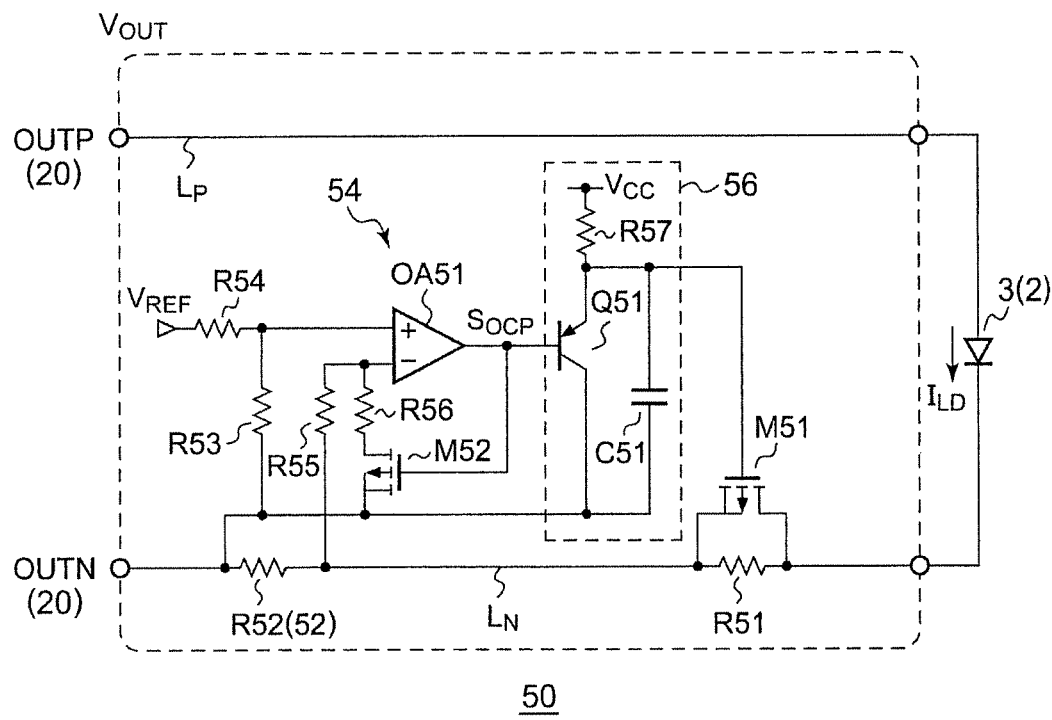
FIGS. 11A and 11B are circuit diagrams showing examples of configurations of the OCP circuit of FIG. 10.
Figure 11B:
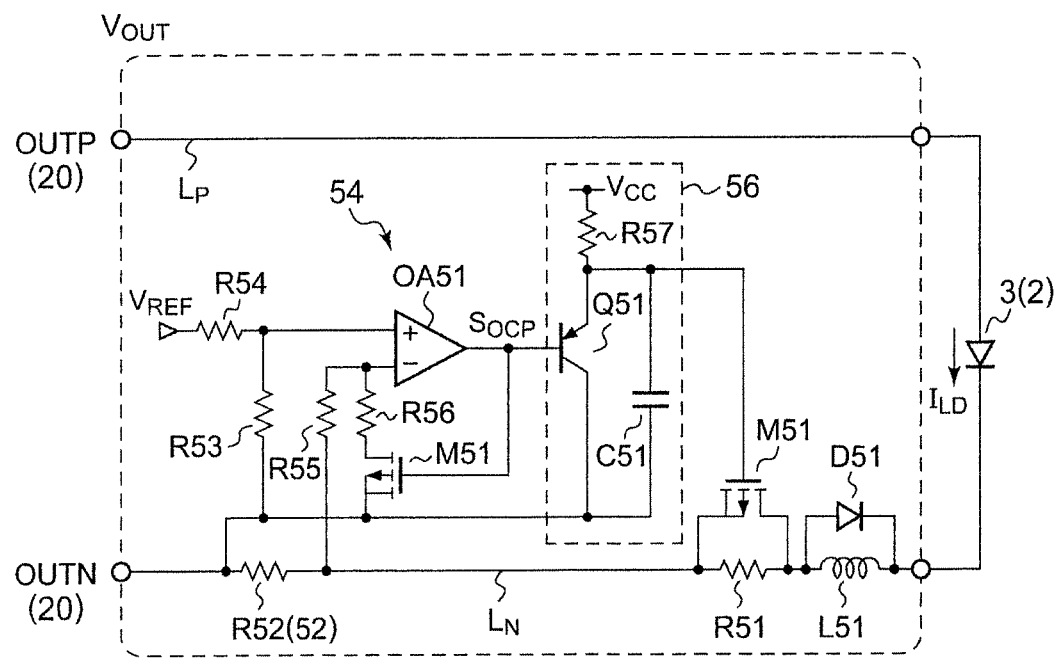

FIGS. 11A and 11B are circuit diagrams showing examples of configuration of the OCP circuit of FIG. 10.

The OCP circuit 50 of FIG. 11A will be described below. The current sensor 52 includes a resistor R52 for current detection. The resistor R52 is provided on the path of the lamp current $I_{LD}$. The voltage drop across the resistor R52 is the current detection signal $I_S$. Similarly to the first exemplary embodiment, an amplifier that amplifies the voltage drop across the resistor R52 may be added. The resistor R52 is provided on a power source line $L_N$ that connects the negative electrode output OUTN of the drive circuit 20 in the previous stage and the negative electrode (cathode) of the light source 2. It is noted that the resistor R52 may be provided on a power source line $L_P$, similarly to the first exemplary embodiment.

An operational amplifier OA51, resistors R53 to R56, and a transistor M52 make up a hysteresis comparator and correspond to the comparator 54 of FIG. 10. An asserted level of the protection signal $S_{OCP}$ in FIG. 11A is a low level.

The timer circuit 56 includes a resistor R57, a transistor Q51, and a capacitor C51. When the protection signal $S_{OCP}$ is asserted (low level), the transistor Q51 is switched ON, the capacitor C51 immediately discharges, the gate-source voltage of the bypass transistor M51 becomes zero, the bypass transistor M51 is switched OFF, and the overcurrent protection is enabled.

When the protection signal $S_{OCP}$ is negated (high level), the transistor Q51 is switched OFF. The capacitor C51 is charged with a given time constant through the resistor R57, and after a delay time corresponding to the time constant elapses, the gate-source voltage of the bypass transistor M51 exceeds the FET threshold value voltage, the bypass transistor M51 is switched ON, and the overcurrent protection is disabled.

The OCP circuit 50 of FIG. 11A can reliably enable a current restriction on a small scale, with a small number of components, and at low cost.

When an overcurrent is detected, the OCP circuit 50 of FIG. 11A switches off the bypass transistor M51 immediately. It is, however, difficult to make a delay be zero. Due to this delay, there may be an issue that the lamp current ILD exceeds the maximum rated current (permitted current) of the laser diode 3 before the bypass transistor M51 is switched OFF.

Then, the OCP circuit 50 of FIG. 11B further includes an inductor L51 that is provided in series with the current restricting resistor R51. Rapid fluctuations in the lamp current $I_{LD}$ are thereby suppressed. A diode D51 is also provided in parallel to the inductor L51. The diode D1 can absorb (clamp) a counter electromotive force generated by the inductor L51.

Fourth Exemplary Embodiment

Figure 12:
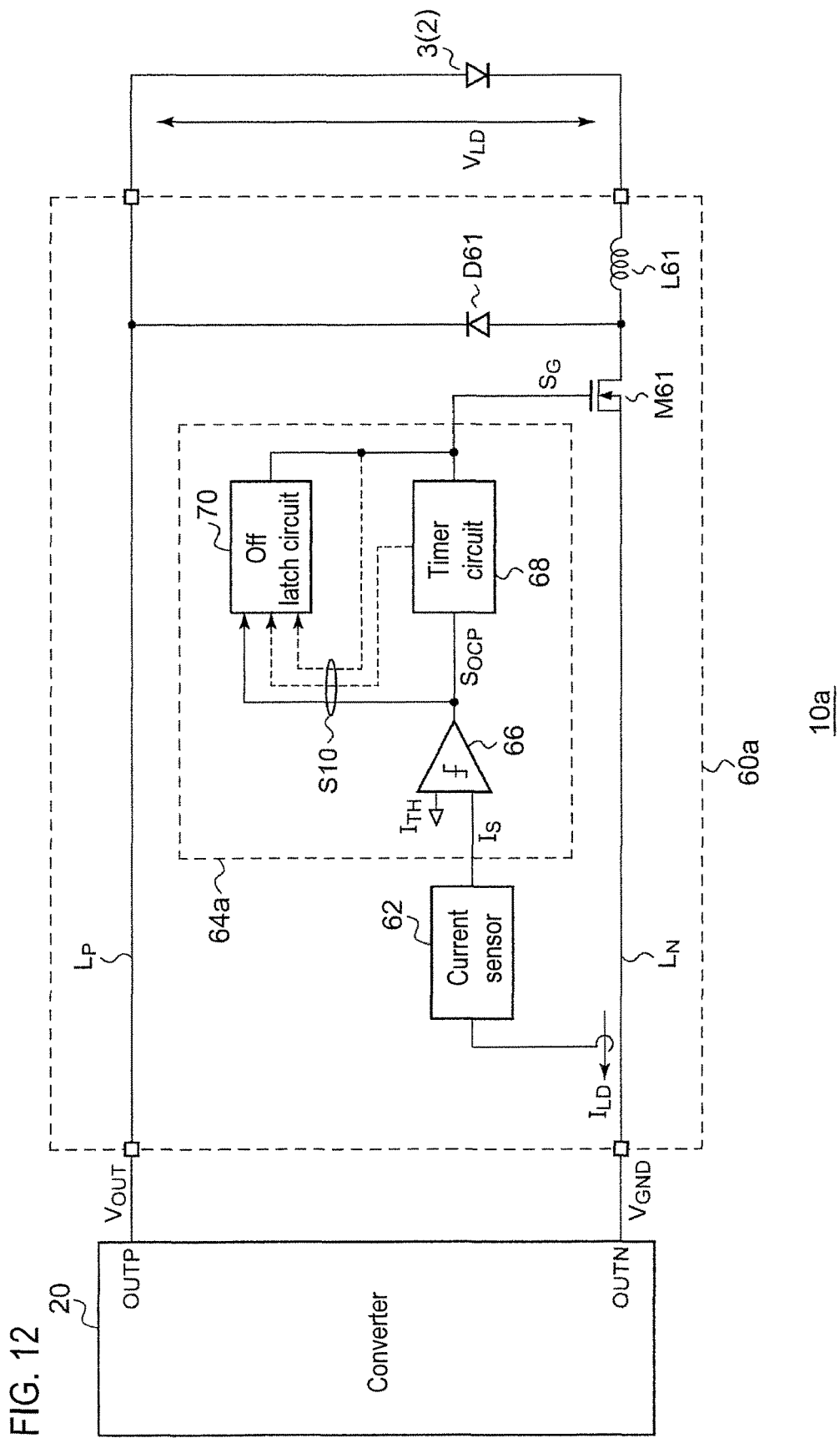
FIG. 12 is a circuit diagram of a lighting circuit provided with an OCP circuit according to a fourth exemplary embodiment.

FIG. 12 is a circuit diagram of a lighting circuit provided with an OCP circuit according to a fourth exemplary embodiment. Differences between a lighting circuit 10a of FIG. 12 and the lighting circuit 10 of FIG. 7 will be described. An OCP controller 64a of an OCP circuit 60a further includes an OFF-latch circuit 70 in addition to the comparator 66 and the first timer circuit 68.

As described above, in the OCP circuit 60, the transistor M61 is continuously ON in the normal state in which $I_S < I_m$. Also, an overcurrent state in which $I_S$ exceeds $I_{TH}$ gives rise to a state in which the transistor M61 is repeatedly switched ON and OFF (referred to as a "switching state").

If the switching state in which the transistor M61 repeatedly switches ON and OFF continues for a predetermined time τ2, the OFF-latch circuit 70 fixes (OFF-latches) the gate signal of the transistor M61 to a low level so as to fix the transistor M61 to an OFF state. The predetermined time τ2 may, for example, be in a range of several hundred ms to several seconds. More specifically, for example, the predetermined time τ2 may be 0.2 seconds.

The OFF-latch circuit 70 determines as to whether the transistor M61 is in a fixed ON state, and whether or not the transistor M61 is switching, by monitoring a signal (hereinafter referred to as a "gate control signal") S10 that instructs ON/OFF of the transistor M61. The gate control signal S10 may be the protection signal $S_{OCP}$, may be the gate signal of the transistor M61, namely, the output signal of the first timer circuit 68, or may be an internal signal of the first timer circuit 68.

The following advantageous effects are obtained by providing the OFF-latch circuit 70.

When a failure occurs in which the switching transistor is short-circuited or the feedback circuit fails in a case where the drive circuit 20 is a switching converter (in particular, a step-down converter), as described above, it becomes impossible to control the lamp current $I_{LD}$ supplied to the laser diode 3, and the overcurrent state continues. In this exemplary embodiment, the OFF-latch circuit 70 is provided. Where the overcurrent state continues for a long time, failure of the circuit is assumed, and the transistor M61 of the OCP circuit 60 is fixed to OFF. Thereby, the laser diode 3 is turned off, and safety can be improved.

FIG. 13A is a block diagram of the OFF-latch circuit 70. The OFF-latch circuit 70 includes a switching detector 72, a second timer circuit 74, a latch circuit 76, and a forced-OFF circuit 78.

The switching detector 72 generates a switching detection signal S11 so that (i) if the transistor M61 is stationarily ON, the switching detection signal S11 is in a first state (for example, at high level) and (ii) if the transistor M61 is in the switching state where the transistor M61 is repeatedly switched ON/OFF, the switching detection signal S11 is in a second state (for example, at low level). As described above, the switching detector 72 may monitor any of the protection signal $S_{OCP}$, the gate signal of the transistor M61, and the internal signal of the first timer circuit 68.

If the switching detection signal S11 has been in the second state (low level) continuously for a predetermined time τ2, the second timer circuit 74 asserts a suspension signal S12. If the suspension signal S12 is asserted, the latch circuit 76 latches this state. If the asserted suspension signal S12 is latched, the forced-OFF circuit 78 forcibly fixes the transistor M61 to the OFF state. The forced-OFF circuit 78 may, for example, include a switch that is provided between the gate of the transistor M61 and the ground. If the asserted suspension signal S12 is latched, the latch circuit 76 may output a high level OFF signal S13. If the OFF signal S13 is a high level, the switch may be switched ON.

FIG. 13B shows a modified example of the forced-OFF circuit 78. The forced-OFF circuit 78 may be configured as a logical gate that performs logical operations for a gate signal $S_G$ which instructs ON/OFF of the transistor M61 and for the output S13 of the latch circuit 76A, and outputs the resulting output $S_G'$ to the gate of the transistor M61. For example, when the latch circuit 76 is configured so that a low level OFF signal S13 is output during a period in which the asserted suspension signal S12 is latched, the logic gate may be a negative logic OR gate.

Figure 14:
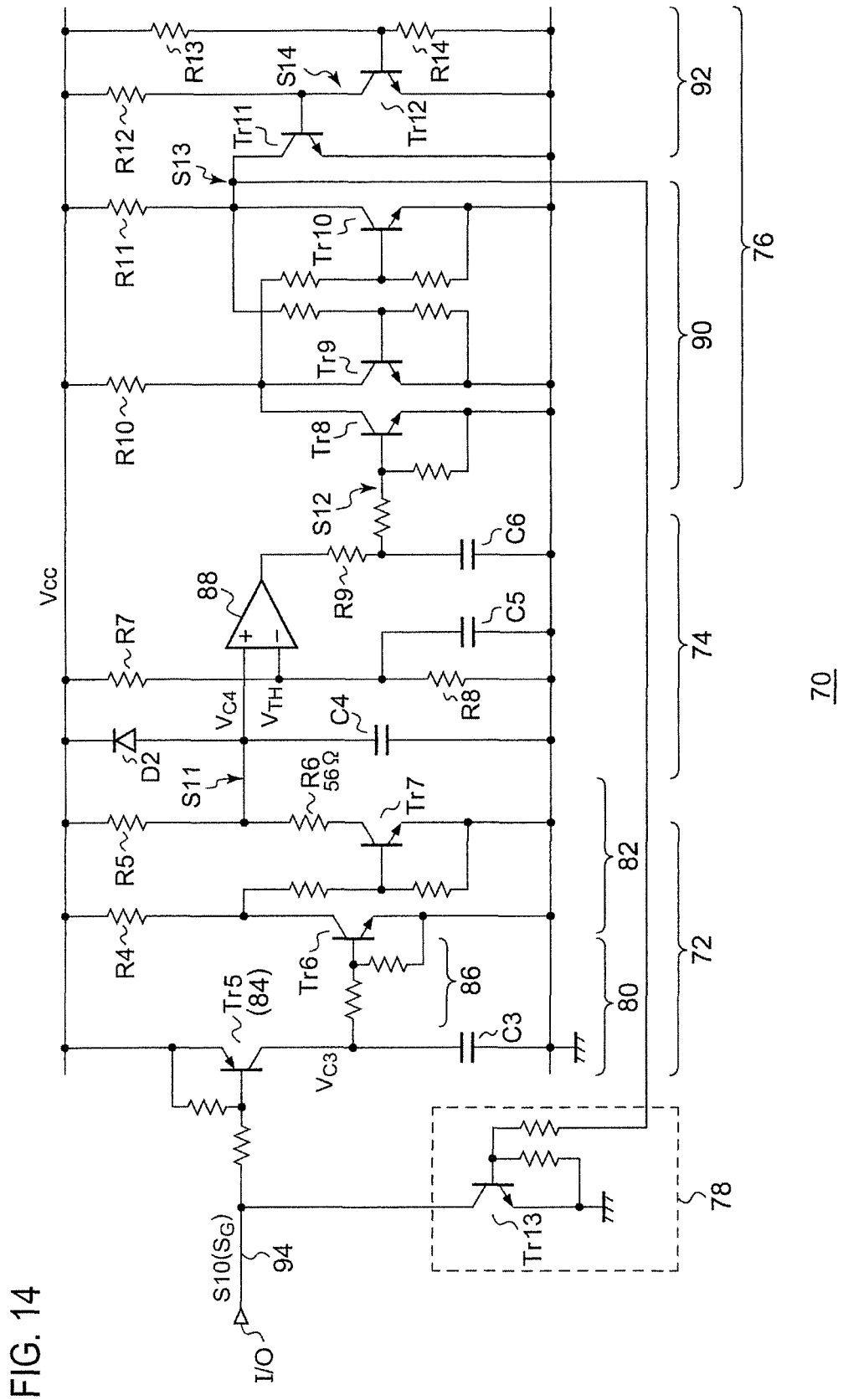
FIG. 14 is a circuit diagram of the OFF-latch circuit.

FIG. 14 is a circuit diagram of the OFF-latch circuit 70. The gate control signal $S_G$ (S10) is input to the input terminal I/O of the OFF-latch circuit 70. For example, in a case where the OFF-latch circuit 70 is provided in the OCP circuit 60 of FIG. 9, the drain of the transistor M62 (the gate of the transistor M61) is connected to the I/O terminal.

The switching detector 72 mainly includes a low pass filter 80 and an output stage 82. The low pass filter 80 eliminates high frequency components which are associated with switching of the gate control signal S10, to thereby smooth the gate control signal S10. The low pass filter 80 includes a capacitor C3, a charging circuit 84, and a discharging circuit 86. One end of the capacitor C3 is grounded, and the other end is connected to a transistor Tr5 which constitutes the charging circuit. The discharging circuit 86 is provided between the other end of the capacitor C3 and the ground.

The output stage 82 includes two inverter stages in series. The first stage inverter includes a transistor Tr6 and a resistor R4. The second stage inverter includes a transistor Tr7 and resistors R5, R6.

The second timer circuit 74 mainly includes a capacitor C4 and a comparator 88. The resistors R7, R8, and the capacitor C5 divide a voltage of a power source voltage $V_{CC}$, and generate a reference voltage (threshold value voltage) $V_{TH}$. An output of the switching detector 72 is connected to the capacitor C4. A diode D2 is a voltage clamper. The comparator 88 compares a voltage $V_{C4}$ of the capacitor C4 with the reference voltage $V_{TH}$. A low pass filter, including a resistor R9 and a capacitor C6, is connected to an output of the comparator 88.

The latch circuit 76 includes a bistable multivibrator circuit (also referred to as a flip-flop or a latch) 90. The bistable multivibrator circuit 90 mainly includes transistors Tr9 to Tr10 and resistors R10 to R11. Since the configuration and operation of the bistable multivibrator circuit 90 are known, description thereon will be omitted. The configuration of the bistable multivibrator circuit 90 is not particularly limited, and a D flip-flop, a D latch, or the like may be used as the bistable multivibrator circuit 90. Output of the bistable multivibrator circuit 90 is output to the forced-OFF circuit 78.

The latch circuit 76 further includes a power-on reset circuit 92. The power-on reset circuit 92 resets the bistable multivibrator circuit 90 to an initial state when the power source voltage $V_{CC}$ is input. The power-on reset circuit 92 includes, for example, resistors R12 to R14 and transistors Tr11, Tr12.

The forced-OFF circuit 78 includes a transistor Tr13 provided between (i) a line 94 that transmits the gate control signal S10 and (ii) the ground. The transistor Tr13 is switched ON when the output S13 of the latch circuit 76 is a high level. When the transistor Tr13 is switched ON, the gate control signal S10 is fixed at a low level, and the transistor M61 is forcefully switched OFF.

Next, an operation of the OFF-latch circuit 70 will be described.

Figure 15A:
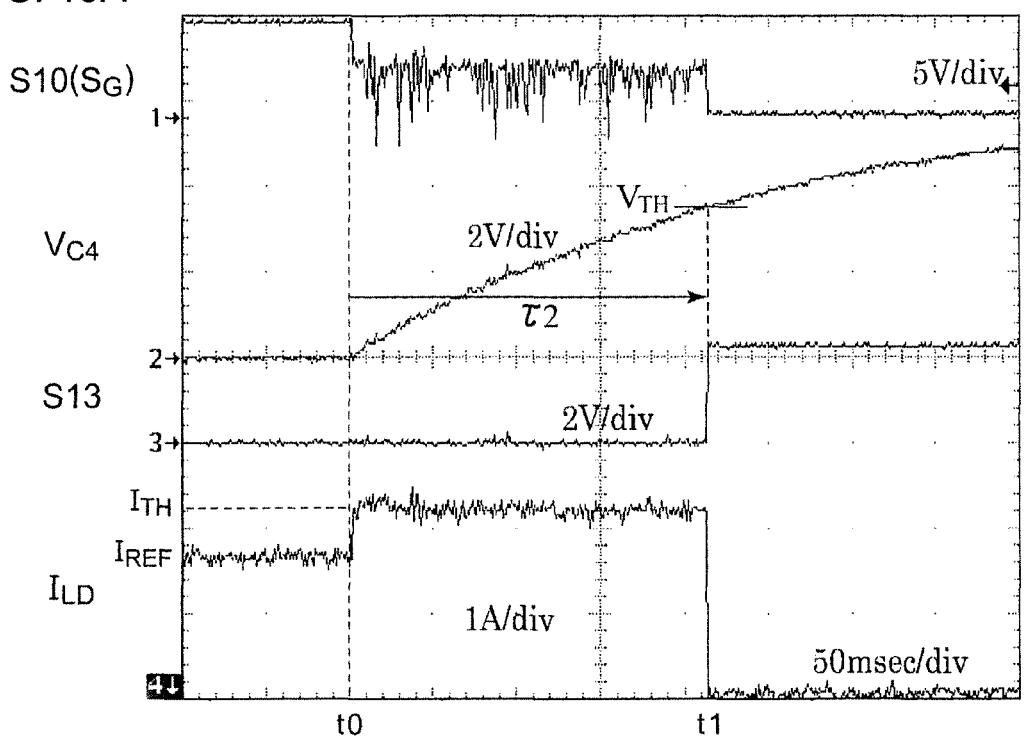
FIGS. 15A and 15B explain operation of an OFF-latch circuit.
Figure 15B:
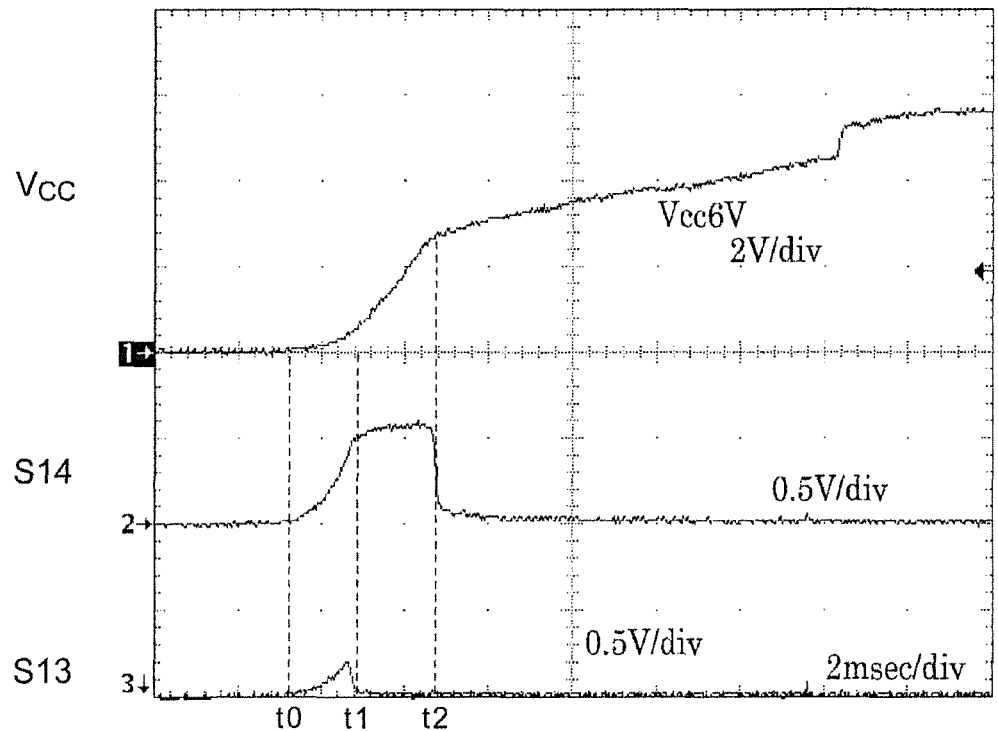

FIGS. 15A and 15B are diagrams for explaining the operation of the OFF-latch circuit 70. FIG. 15A shows an overcurrent protection operation.

In a normal state prior to a timing t0, the drive current $I_{LD}$ is held at a target current $I_{REF}$. The gate control signal S10 is steadily at a high level at this time. Therefore, the transistor Tr5 is OFF, the transistor Tr6 is OFF, and the Tr7 is ON. The charge of the capacitor C4 is thereby discharged through the transistor Tr7, and the voltage $V_{C4}$ is maintained at 0V.

When the mode transitions to an overcurrent state at timing t0, the drive current $I_{LD}$ increases. In the overcurrent state, the gate control signal S10 of the transistor M61 oscillates, and the transistor M61 performs switching. The drive current $I_{LD}$ is thereby maintained so as not to exceed the threshold value $I_{TH}$.

When the gate control signal S10 switches, the transistor Tr5 switches. The voltage $V_{C3}$ across the capacitor C3 accordingly rises, the transistor Tr6 switches ON, and the transistor Tr7 switches OFF.

When the transistor Tr7 switches OFF, the capacitor C4 is charged through the resistor R5, and the capacitor voltage $V_{C4}$ increases with time. Then, when the capacitor voltage $V_{C4}$ exceeds the threshold voltage $V_{TH}$ at a timing t1 after the predetermined time τ2 elapses, the output of the comparator 88 becomes a high level, and the transistor Tr8 switches ON. The bistable multivibrator circuit 90 is accordingly latched in a state where the transistor Tr10 is OFF and the transistor Tr9 is ON. Thus, the OFF signal S13 is fixed at a high level. The transistor Tr13 is accordingly switched ON, the gate control signal S10 becomes a low level, and the transistor M61 is forcibly switched OFF.

Next, a power-on reset operation at a time when the power source is input will be described with reference to FIG. 15B. When the power source is input at a timing t0, the power source voltage $V_{CC}$ starts to rise. An operation of the circuit is unstable from the timing t0 to a timing t1.

The voltage which is obtained by dividing the power source voltage $V_{CC}$ by the resistors R13, R14 is supplied to the base of the transistor Tr12. From the timing t1 to a timing t2, the base-emitter voltage of the transistor Tr12 is less than 0.6V, and the transistor Tr12 is accordingly OFF. At this time, the power source voltage $V_{CC}$ is supplied to the base of the transistor Tr11 through the resistor R12, this base voltage S14 is maintained around 0.6V, and the transistor Tr11 is switched ON. The OFF signal S13 is thereby reset to a low level.

The power source voltage $V_{CC}$ rises from the timing t2 onward. When the base voltage of the transistor Tr12 exceeds 0.6V, the transistor Tr12 switches ON and the transistor Tr11 switches OFF. The reset of the bistable multivibrator circuit 90 is thereby disabled. Driving of the laser diode 3 can accordingly be started from a state where forced-OFF is disenabled by power-on reset when the power source is input.

Fifth Exemplary Embodiment

Figure 16:
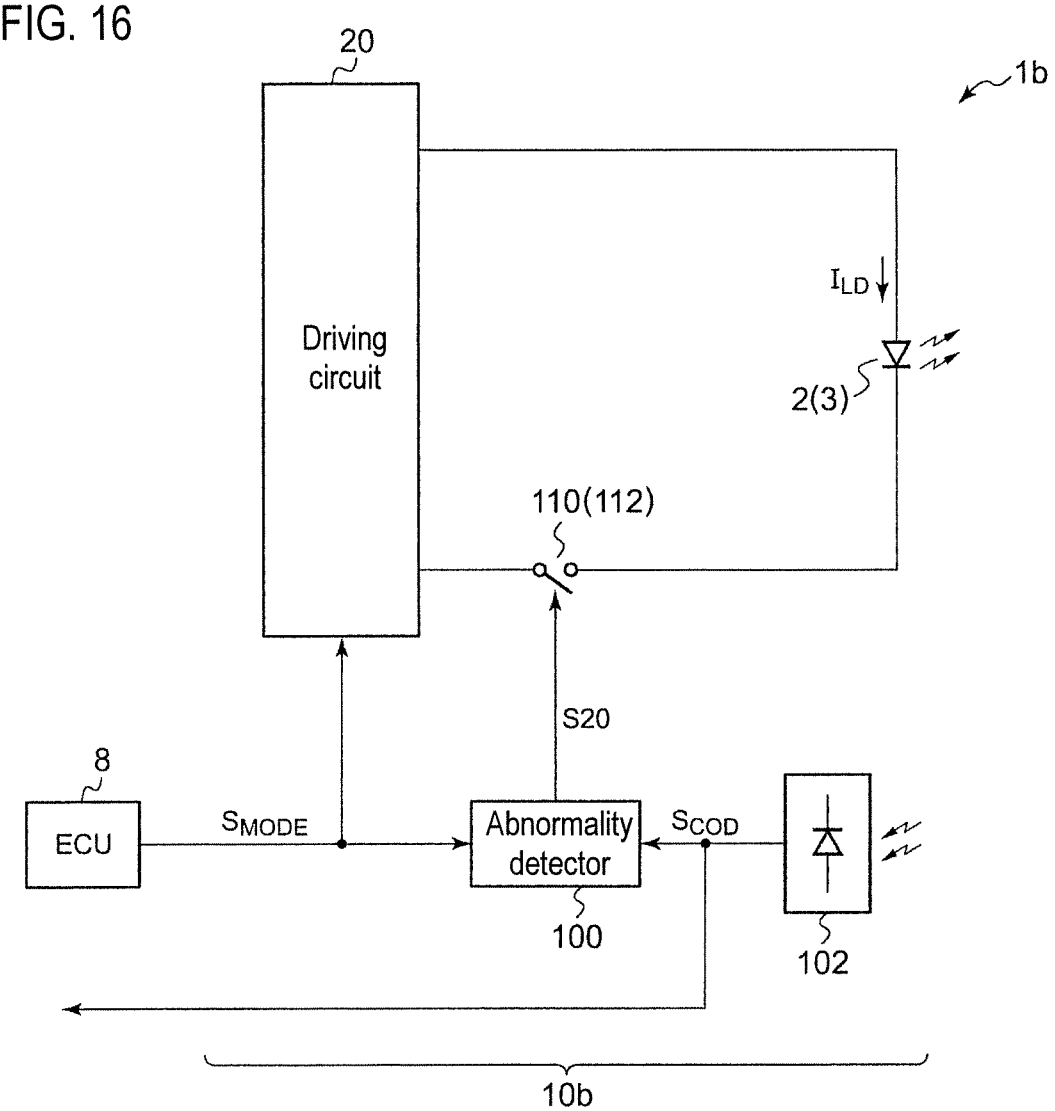
FIG. 16 is a block diagram of a vehicle lamp according to a fifth exemplary embodiment.

FIG. 16 is a block diagram of a vehicle lamp 1b according to a fifth exemplary embodiment. The drive circuit 20 may be a constant-current switching converter. In this exemplary embodiment, the light source 2 includes the laser diode 3 and a phosphor. The drive circuit 20 has several selectable modes. The drive circuit 20 causes the laser diode 3 to emit light at a different intensity in each mode. For example, the drive circuit 20 is able to switch between a first mode and a second mode. In the first mode, the drive circuit 20 causes the laser diode 3 to emit light at an ordinary intensity. In the second mode, the drive circuit 20 causes the laser diode 3 to emit light at an intensity lower than the ordinary intensity. For example, the first mode may be a travelling mode in which the drive circuit 20 causes the light source 2 to emit light at an intensity sufficient to illuminate ahead of the vehicle during ordinary travelling. The second mode may be a test mode in which the drive circuit 20 causes the light source 2 to weakly emit light for the purpose of light axis adjustments, testing, or maintenance. An electronic control unit (ECU) 8 supplies a mode signal $S_{MODE}$ indicating the current mode to the drive circuit 20. The ECU 8 may be installed on the vehicle side or may be installed on the vehicle lamp 1b side.

It is assumed that the second mode is a test mode in which light is to be emitted at low luminance. In this case, if the light source 2 emits light at high luminance, there is a concern that glare may be caused to nearby workers and the like. Likewise, it is alternatively assumed that the second mode is a mode in which light should be emitted at low luminance while the vehicle is travelling. In this case, if the light source 2 emits light at high luminance, glare may be caused to an oncoming vehicle and a pedestrian. Namely, it is an abnormal state for the light source 2 to emit light at high luminance in the second mode. In order to resolve such issues, an abnormality detector 100 and a protection circuit 110 are provided in the vehicle lamp 1b.

The abnormality detector 100 optically monitors the light source 2. When the intensity of the light source 2 exceeds a permitted level in a low luminance mode in which the light source 2 is lit at an intensity lower than an ordinarily intensity, the abnormality detector 100 asserts an abnormality detection signal S20.

The vehicle lamp 1b requires a function to generate a diagnostic signal that notifies the vehicle side ECU of lighting failure in the light source 2. There is a failure mode in which the laser diode 3 does not emit light (catastrophic optical damage (COD)) even through the electrical characteristics of the laser diode 3 are normal. Therefore, merely monitoring the electrical characteristics is not sufficient to detect failure in the laser diode 3. There is a case where a light emission detector 102 is provided that optically detects light emitted from the laser diode 3. The light emission detector 102 includes a photodiode, a phototransistor, a CMOS sensor, a charge coupled device, or the like. The light emission detector 102 determines as to whether or not the light source 2 is lit normally.

If the light emission detector 102 detects that the light source 2 is unlit in the ordinary mode, the light emission detector 102 asserts the $S_{COD}$ signal (for example, high level). Also, the $S_{COD}$ signal is negated (low level) during normal lighting. The $S_{COD}$ signal is transmitted to the vehicle side as a diagnostic signal.

In a preferable exemplary embodiment, the light emission detector 102 may also be used in detecting an abnormal state in the second mode. Namely, a detection threshold value of the light emission detector 102 is set so as to be higher than the permitted level in the low luminance mode, and the abnormality detector 100 references to the output $S_{COD}$ of the light emission detector 102. Thereby, the output $S_{COD}$ of the light emission detector 102 can be used in the abnormality detection executed by the abnormality detector 100. More specifically, when the $S_{COD}$ signal is negated in the second mode, the abnormality detector 100 may determine the abnormal state. Since an emission light detector is not required in the second mode, increase of a circuit surface area can be suppressed.

Another emission light detector for detecting an abnormality in the second mode may also be provided in addition to the light emission detector 102 for COD detection. In such a case, the permitted levels (threshold values) may be set individually.

If the abnormal detection signal S20 is asserted, the protection circuit 110 restricts power supply from the drive circuit 20 to the light source 2. Examples of restricting the power supply include suspending the power supply, lowering the power supply and the like. For example, the protection circuit 110 may be configured to include a switch 112 provided on a path of the drive current $I_{LD}$ and to suspend supply of power to the light source 2 by switching the switch 112 OFF.

The configuration of the vehicle lamp 1b according to the fifth exemplary embodiment has been described above. Next, an operation of the vehicle lamp 1b will be described. When the mode signal $S_{MODE}$ indicates the second mode, the drive circuit 20 supplies a small drive current $I_{LD}$ to the light source 2. Then, the light source 2 emits light at a luminance according to the small drive current $I_{LD}$. In a case where the light source 2 employs a combination of the laser diode 3 and the phosphor, if an abnormality occurs, such as the phosphor being detached, excitation light from the laser diode 3 would be emitted as it is.

If the light source 2 is normal, the light emission detector 102 detects only faint light at a less level than the permitted level of the second mode. Thus, the $S_{COD}$ signal should be asserted. However, if the light source 2 is abnormal, then the light emission detector 102 detects light of a sufficient intensity for the $S_{COD}$ signal to be negated. If the mode signal $S_{MODE}$ indicates the second mode and the $S_{COD}$ signal is negated, the abnormality detector 100 asserts the abnormality detection signal S20. The switch 112 of the protection circuit 110 is accordingly switched OFF, and emission of light from the laser diode 3 is immediately stopped.

In this manner, the lighting circuit 10b of FIG. 16 prevents the excitation light from leaking out as it is when the laser diode 3 is lit in the test mode in a state where an abnormality occurs in the phosphor, and prevents nearby workers and the like from being illuminated. As a result, safety can be improved.

Figure 17:
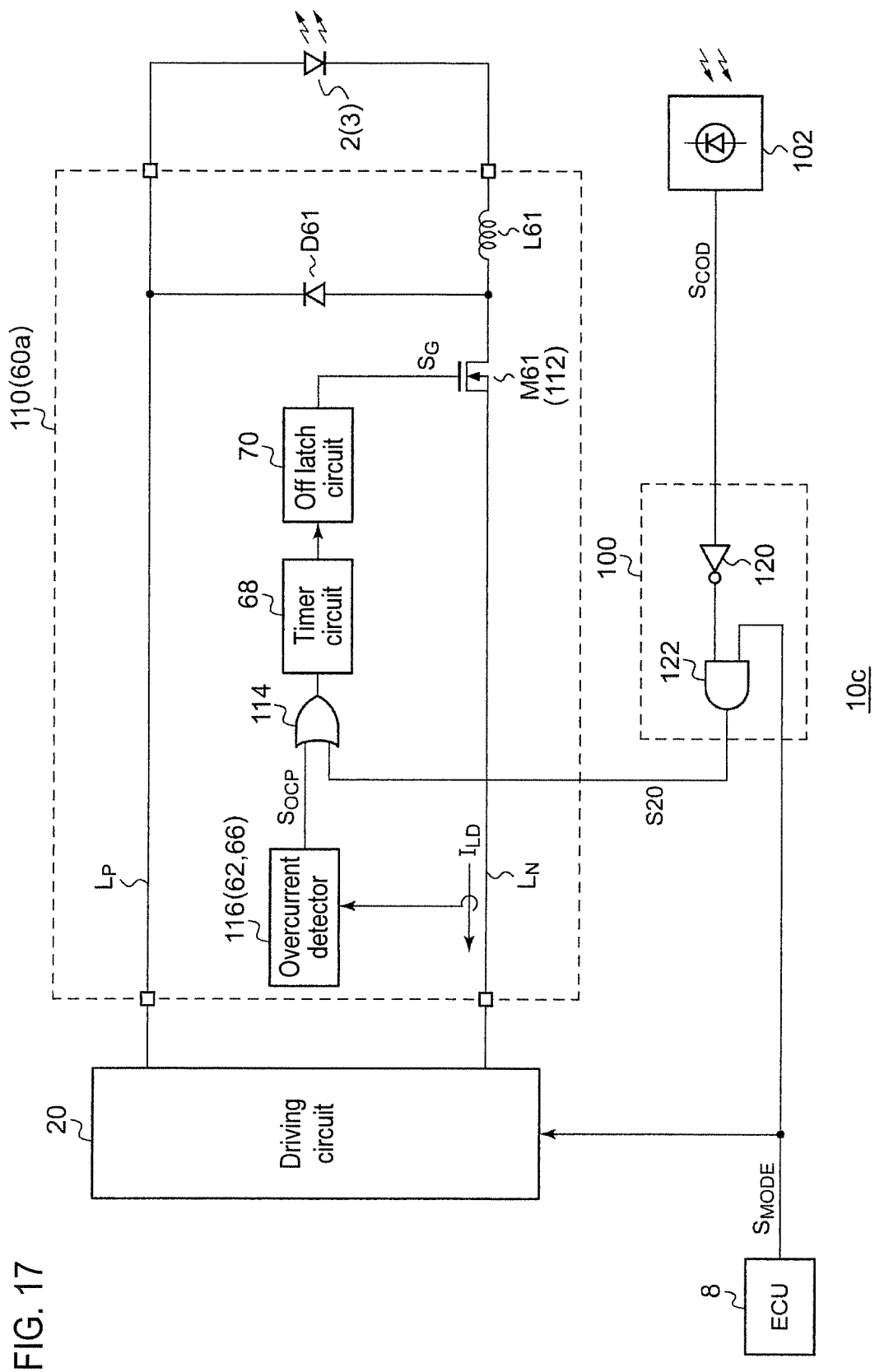
FIG. 17 is a circuit diagram showing an example of a specific configuration of a lighting circuit of the fifth exemplary embodiment.

FIG. 17 is a circuit diagram showing an example of a specific configuration of a lighting circuit 10b according to the fifth exemplary embodiment. The abnormality detector 100 may be configured by a combination of logic gates. If a high level of the mode signal $S_{MODE}$ corresponds to the second mode, the abnormality detector 100 may include an inverter 120 and an AND gate 122. The inverter 120 inverts the $S_{COD}$ signal. An output of the inverter 120 is asserted (high level) when the laser diode 3 emits light exceeding the permitted level. The AND gate 122 takes a logical sum of the mode signal $S_{MODE}$ and the output of the inverter 120, and outputs the result as the abnormality detection signal S20. It should be noted that the assignment of high level/low level to each signal may be changed, and in such a case, inverters may be added or omitted or OR gates may be substituted for AND gates.

The lighting circuit 10c of FIG. 17 may be regarded as a combination of the lighting circuit 10b of FIG. 16 and the lighting circuit 10a of FIG. 12. In addition to the OCP circuit 60a of FIG. 12, the protection circuit 110 also includes a logic gate 114. The transistor M61 corresponds to the switch 112 of FIG. 16. An overcurrent detector 116 corresponds to the current sensor 62 and the comparator 66 of FIG. 16. The logic gate 114 applies a start trigger to the first timer circuit 68 when the protection signal $S_{OCP}$ is asserted or when the abnormality detection signal S20 is asserted. The logic gate 114 may be, for example, an OR gate.

Figure 2A:
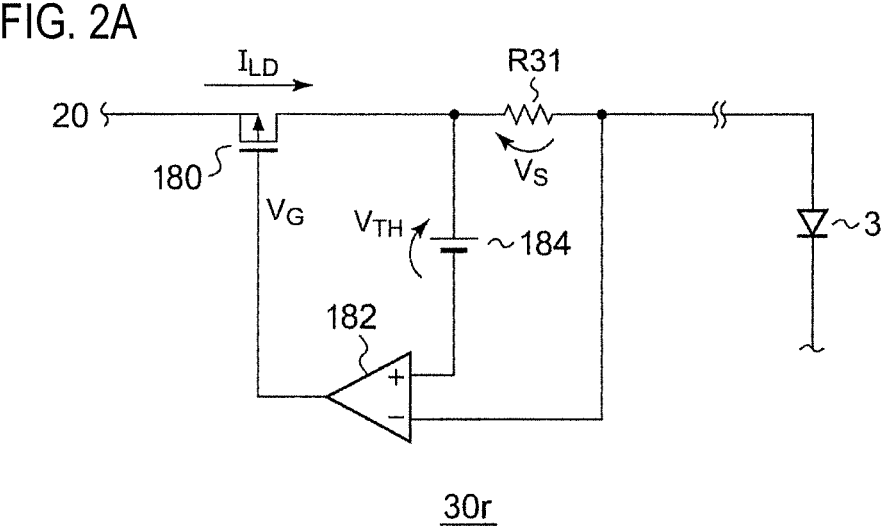
FIGS. 2A and 2B are circuit diagrams of OCP circuits investigated by the inventor.
Figure 2B:
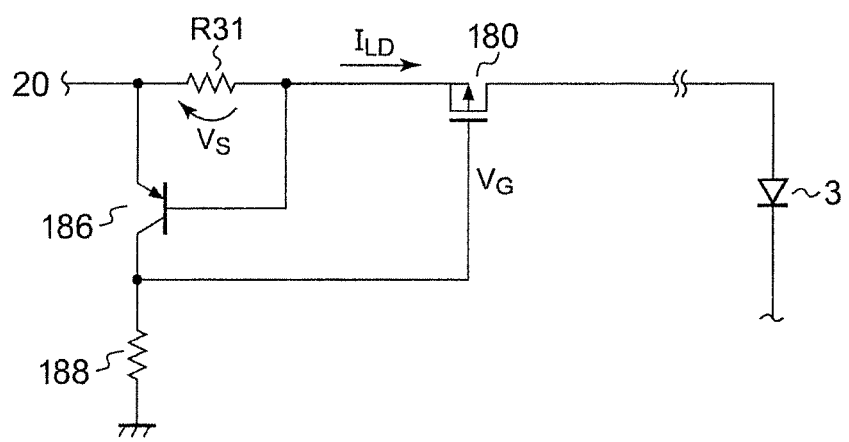

It is noted that the configuration of the protection circuit 110 is not limited to that of FIG. 17. For example, the protection circuit 110 may include the OCP circuit 30 of FIG. 2, or of FIGS. 3 to 5, or may include the OCP circuit 60 of FIGS. 7 and 9, or may include the OCP circuit 50 of FIGS. 10 and 11. Alternatively, the protection circuit 110 may simply include the switch 112 alone as shown in FIG. 16 when combination with overcurrent protection function is not required.

Figure 18:
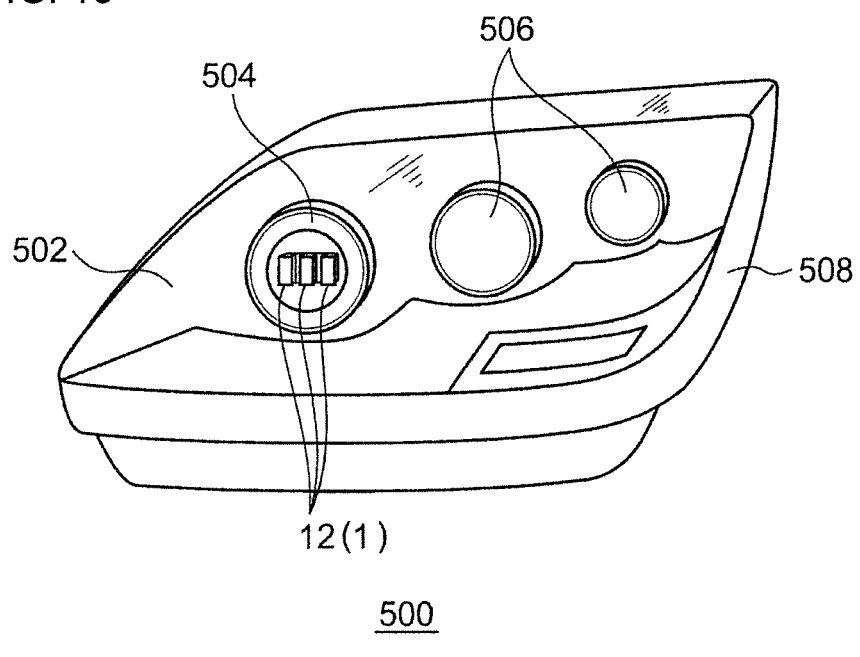
FIG. 18 is a perspective view of a lamp unit provided with a vehicle lamp according to an exemplary embodiment.

Lastly, an application of the vehicle lamp 1 will be described. FIG. 18 is a perspective view of a lamp unit (lamp assembly) 500 provided with the vehicle lamp 1 according to the exemplary embodiment. The lamp unit 500 includes a transparent cover 502, a high beam unit 504, a low beam unit 506, and a casing 508. The vehicle lamp 1 described above may be employed, for example, in the high beam unit 504. The vehicle lamp 1 may include single or plural light sources 2. The vehicle lamp 1 may also be employed in the low beam unit 506, instead of, or in addition to, the high beam unit 504.

The invention has been explained above based on the exemplary embodiments. However, these exemplary embodiments are merely examples, and a person of ordinary skill in the art would appreciate that various modified examples are possible by combining the respective configuration elements and respective treatment processes, with such modified examples also falling within the scope of the invention. Such modified examples will be described below.

First Modified Example

In the exemplary embodiments, the drive circuit 20 is a switching converter. However, the invention is not limited thereto. A linear regulator, or a combination of a switching converter and a linear regulator may be employed. The advantageous effects described for each of the exemplary embodiments can also be obtained.

Second Modified Example

The OFF-latch circuit 70 described in the fourth exemplary embodiment is also be applicable to the OCP circuits 30 of FIGS. 3 and 5. In such a case, instead of the transistor M61, the OFF-latch circuit 70 may be configured to fix the transistor M31 OFF when a state continues for the predetermined time T2 in which the transistor M31 repeatedly switches ON and OFF. Alternatively, the OFF-latch circuit 70 may be combined with the OCP circuit 50 of FIGS. 10, 11A, and 11B.

Explanation of the invention has been given in specific terms based on exemplary embodiments thereof. The exemplary embodiments, however, merely illustrates the principles and an application of the invention. Many modified examples and changes to placement may be made in the exemplary embodiments within a range not departing from the spirit of the invention as defined by the claims.

What is claimed is:

1. A lighting circuit for a light source, the lighting circuit comprising:
   a drive circuit that includes a first transistor, supplies a lamp current to the light source, detects the lamp current, and executes feedback control by adjusting the duty ratio of the first transistor between ON and OFF such that the lamp current approaches a target current; and
   an overcurrent protection circuit that restricts the lamp current flowing into the light source so that the lamp current does not exceed an overcurrent threshold value,
   wherein the drive circuit, the overcurrent protection circuit, and the lamp source are connected in series,
   wherein an output of the drive circuit is input to the overcurrent protection circuit,
   wherein an output of the overcurrent protection circuit is input to the lamp source,
   wherein the overcurrent protection circuit comprises:
      a second transistor,
      an inductor,
      a rectifier,
      a current sensor that generates a current detection signal according to the lamp current, and
      an overcurrent protection controller that controls ON/OFF of the second transistor based on the current detection signal and the overcurrent threshold value,
   wherein the second transistor, the inductor and the rectifier are disposed in a T-shape,
   wherein, if the current detection signal exceeds a threshold value level that is determined according to the overcurrent threshold value, the overcurrent protection controller immediately switches the second transistor OFF, and
   wherein, if the current detection signal falls below the threshold value level, the overcurrent protection controller switches the second transistor ON after a predetermined delay time elapses and maintains the second transistor to be ON until the current detection signal again exceeds the threshold value level.

2. The lighting circuit according to claim 1,
   wherein the overcurrent protection controller comprises:
      a comparator that:
         receives the current detection signal at a first input terminal thereof,
         receives a predetermined threshold value voltage at a second input terminal thereof, and
         generates a protection signal which is asserted when the current detection signal exceeds the threshold value voltage, and a first timer circuit that delays an edge, corresponding to transition from an asserted level to a negated level, of the protection signal by the delay time.

3. The lighting circuit of claim 1,
wherein the second transistor and the inductor are provided in series between a positive output of the drive circuit and a positive electrode of the light source, and
wherein the rectifier is provided between (i) a connection point between the second transistor and the inductor, and (ii) a power source line that connects a negative output of the drive circuit and a negative electrode of the light source.

4. The lighting circuit of claim 1,
wherein the second transistor and the inductor are provided in series between a negative output of the drive circuit and a negative electrode of the light source, and
wherein the rectifier is provided between (i) a connection point between the second transistor and the inductor and (ii) a power source line that connects a positive output of the drive circuit to a positive electrode of the light source.

5. The lighting circuit of claim 1, wherein the overcurrent protection controller comprises an OFF-latch circuit that fixes the second transistor OFF when a state continues for a predetermined time where the second transistor repeatedly switches ON and OFF.

6. The lighting circuit of claim 5, wherein the OFF-latch circuit monitors a signal to instruct ON/OFF switching of the second transistor.

7. The lighting circuit of claim 1, further comprising:
an abnormality detector that optically monitors the light source and that asserts an abnormality detection signal when an intensity of the light source exceeds a permitted level in a low luminance mode in which the light source is lit at an intensity lower than a level at which the light source is lit in an ordinary luminance mode,
wherein the second transistor is switched OFF when the abnormality detection signal is asserted.

8. The lighting circuit of claim 7, further comprising:
an emission light detector that optically detects whether or not the light source is lit normally,
wherein the abnormality detector asserts the abnormality detection signal when the emission light detector indicates normal lighting in the low luminance mode.

9. The lighting circuit according to claim 1,
wherein the current sensor includes a resistor provided on a ground terminal side with respect to the second transistor, the inductor and the rectifier, and generates a voltage across the resistor based on a ground voltage as the current detection signal.

10. The lighting circuit according to claim 1, wherein the second transistor is provided separately from the first transistor of the drive circuit.

11. A lighting circuit for a light source, the lighting circuit comprising:

a drive circuit that includes a first transistor, supplies a lamp current to the light source, detects the lamp current, and executes feedback control by switching the first transistor ON and OFF such that the lamp current approaches a target current; and
an overcurrent protection circuit that is inserted between the drive circuit and the light source and that restricts the lamp current flowing into the light source so that the lamp current does not exceed an overcurrent threshold value,
wherein the overcurrent protection circuit comprises:
a second transistor,
an inductor,
a rectifier,
a current sensor that generates a current detection signal according to the lamp current, and
an overcurrent protection controller that controls ON/OFF of the second transistor based on the current detection signal and the overcurrent threshold value,
wherein the second transistor, the inductor and the rectifier are disposed in a T-shape,
wherein, if the current detection signal exceeds a threshold value level that is determined according to the overcurrent threshold value, the overcurrent protection controller immediately switches the second transistor OFF,
wherein, if the current detection signal falls below the threshold value level, the overcurrent protection controller switches the second transistor ON after a predetermined delay time elapses,
wherein the overcurrent protection controller comprises an OFF-latch circuit that fixes the second transistor OFF when a state continues for a predetermined time where the second transistor repeatedly switches ON and OFF,
wherein the OFF-latch circuit comprises:
a switching detector that generates a switching detection signal that adopts:
a first state when the second transistor is steadily ON, and
a second state when the second transistor repeatedly switches ON and OFF,
a second timer circuit that asserts a suspension signal when the second state of the switching detection signal has continued for the specific time, and
a forced-OFF circuit that forcibly switches the second transistor OFF when the suspension signal is asserted.

12. A vehicle lamp comprising:
a light source; and
the lighting circuit of claim 1 that drives the light source.

* * * * *